(12) United States Patent
Shin et al.

(10) Patent No.: US 11,914,423 B2
(45) Date of Patent: Feb. 27, 2024

(54) FLEXIBLE DISPLAY DEVICE

(71) Applicant: LG ELECTRONICS INC., Seoul (KR)

(72) Inventors: Min Chul Shin, Gunpo-si (KR); Hang Seok Kim, Yongin-si (KR); Gil Jae Lee, Seongnam-si (KR); Dong Jun Choi, Gimpo-si (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 17/435,849

(22) PCT Filed: Apr. 11, 2019

(86) PCT No.: PCT/KR2019/004375
§ 371 (c)(1),
(2) Date: Sep. 2, 2021

(87) PCT Pub. No.: WO2020/209425
PCT Pub. Date: Oct. 15, 2020

(65) Prior Publication Data
US 2022/0155823 A1     May 19, 2022

(51) Int. Cl.
*G06F 1/16* (2006.01)
(52) U.S. Cl.
CPC .......... *G06F 1/1652* (2013.01); *G06F 1/1624* (2013.01)
(58) Field of Classification Search
CPC .... G06F 1/1652; G06F 1/1624; G06F 1/1637; G06F 2203/04102; G06F 3/0412; H04M 1/0237; H04M 1/0268; G09F 9/301
See application file for complete search history.

(56) References Cited

U.S. PATENT DOCUMENTS

| | | | | |
|---|---|---|---|---|
| 8,379,377 B2* | 2/2013 | Walters | ................ | G06F 1/1641 |
| | | | | 361/679.04 |
| 9,195,272 B2* | 11/2015 | O'Brien | ............. | H04M 1/0268 |
| 9,286,812 B2* | 3/2016 | Bohn | .................... | H10K 50/84 |
| 9,860,353 B2* | 1/2018 | Lee | ...................... | H04M 1/0268 |
| 10,194,543 B2* | 1/2019 | Seo | ....................... | G06F 1/1626 |
| 10,684,714 B2* | 6/2020 | Seo | ....................... | G06F 1/3218 |

(Continued)

FOREIGN PATENT DOCUMENTS

| | | |
|---|---|---|
| CN | 102902308 A | 1/2013 |
| CN | 105761615 A | 7/2016 |

(Continued)

*Primary Examiner* — Rockshana D Chowdhury
(74) *Attorney, Agent, or Firm* — Birch, Stewart, Kolasch & Birch, LLP

(57) ABSTRACT

A flexible display device is provided. A flexible display device according to one embodiment of the present invention comprises a body, a moving plate, a first pulley, a second pulley, a driving track and a flexible display. The flexible display is coupled to outer surfaces of the moving plate and the driving track, and the driving track forms a continuous track shape by itself or together with the moving plate. Therefore, provided is the flexible display device in which a constant tension can be maintained over the entire section of the driving track while the moving plate and the driving track support the flexible display, the occurrence of spring back in the flexible display can be minimized, and damage caused by unevenness of the flexible display, and the like, can be prevented.

18 Claims, 16 Drawing Sheets

(56) References Cited

U.S. PATENT DOCUMENTS

| | | | |
|---|---|---|---|
| 11,102,339 B2* | 8/2021 | Ahn | G06F 1/1652 |
| 11,194,363 B2* | 12/2021 | Kim | G06F 1/1652 |
| 11,315,443 B2* | 4/2022 | Han | G06F 1/1652 |
| 11,462,134 B2* | 10/2022 | Zhang | G06F 1/1601 |
| 11,527,179 B2* | 12/2022 | Han | G06F 1/1652 |
| 11,619,975 B2* | 4/2023 | Cai | G06F 1/1652 |
| | | | 361/679.01 |
| 2006/0166713 A1 | 7/2006 | Yeh et al. | |
| 2012/0314400 A1* | 12/2012 | Bohn | H04M 1/0237 |
| | | | 361/679.01 |
| 2013/0058063 A1 | 3/2013 | O'Brien | |
| 2014/0211399 A1 | 7/2014 | O'Brien | |
| 2018/0077808 A1 | 3/2018 | Seo et al. | |
| 2019/0029131 A1 | 1/2019 | Han et al. | |
| 2020/0253063 A1* | 8/2020 | Jiang | G06F 1/1624 |
| 2021/0181801 A1* | 6/2021 | Yin | G06F 1/1652 |
| 2021/0373603 A1* | 12/2021 | Feng | G06F 1/1624 |
| 2022/0182477 A1* | 6/2022 | Kim | H04M 1/0237 |
| 2022/0418122 A1* | 12/2022 | Liu | G06F 1/1652 |

FOREIGN PATENT DOCUMENTS

| | | |
|---|---|---|
| CN | 106790835 A | 5/2017 |
| CN | 107102692 A | 8/2017 |
| CN | 107845333 A | 3/2018 |
| CN | 107919065 A | 4/2018 |
| CN | 108064431 A | 5/2018 |
| CN | 108259649 A | 7/2018 |
| EP | 2 919 226 A1 | 9/2015 |
| EP | 3 702 880 A1 | 9/2020 |
| EP | 3 770 721 A1 | 1/2021 |
| JP | 2005-309086 A | 11/2005 |
| KR | 10-2011-0082943 A | 7/2011 |
| KR | 10-1107127 B1 | 1/2012 |
| KR | 10-2014-0059274 A | 5/2014 |
| KR | 10-2017-0116551 A | 10/2017 |
| KR | 10-2018-0036904 A | 4/2018 |
| KR | 10-2019-0001389 A | 1/2019 |
| KR | 10-2019-0004618 A | 1/2019 |
| KR | 10-1945985 B1 | 2/2019 |
| WO | WO2018/153165 A1 | 8/2018 |
| WO | WO 2018/186631 A1 | 10/2018 |

* cited by examiner

FLEXIBLE DISPLAY DEVICE

CROSS REFERENCE TO RELATED APPLICATIONS

This application is the National Phase of PCI International Application No. PCT/KR2019/004375, filed on Apr. 11, 2019, which is hereby expressly incorporated by reference into the present application.

FIELD

The present disclosure relates to a bendable flexible display and, more particularly, to a flexible display device in which an area of a flexible display exposed at any one side thereof is variable.

BACKGROUND

With the development of flexible displays that can be bent while displaying image information thereon, research and development have been underway to provide a foldable device by applying a flexible display to a device having two bodies and a folding structure (for example, a hinge part). In such a foldable device, since the flexible display may be disposed to completely cover the two bodies and the folding structure, a relatively large-sized display may be implemented in the device.

As another example of the device using a flexible display, rollable devices having a structure in which a display is rolled up and unrolled have been studied and developed. In such rollable devices, as the flexible display is rolled, the total size or area of the entire display can be reduced. On the contrary, as the flexible display is unrolled, the total size or area of the entire display can be increased.

In such foldable devices and rollable devices, the flexible display may be elastically deformed and elastically restored while the shape thereof is varied. Therefore, springback may occur in a part of the flexible display that is deformed.

When springback occurs in the flexible display, interference or friction may occur between the flexible display and other parts of the device, or the flexible display may be damaged, or the device may not operate smoothly. Therefore, consideration should be given to controlling springback in the flexible display.

Such a device including the flexible display may be configured such that the flexible display is moved (for example, a sliding movement). Here, when the flexible display is not smoothly moved, or uniform tensile force is not applied to the flexible display while the flexible is moved, it may become difficult to operate the device, and the flexible display may become uneven or damaged.

As a related art document using a flexible display, Korean Patent Registration No. 1107127 (hereinafter, referred to as "related art 1") discloses a mobile terminal comprising a flexible display in which a size of a screen exposed to the outside is variable, a driver, a sliding member, a first rack gear, and a second rack gear.

In related art 1, the size of the screen of the flexible display can be varied by the driving of the driver. However, since the mobile terminal of related art 1 does not include a component for supporting the bottom surface of the flexible display, unevenness of the flexible display may be easily caused.

Further, in related art 1, the first rack gear and the second rack gear are configured to be separated from each other and to be coupled to a pinion gear. However, backlash of the gears may cause deflection of the flexible display during operation, and it may become difficult to control the tension applied to the entire section of the flexible display.

Further, in related art 1, it is difficult to apply uniform tension to the flexible display, and it is also difficult to control springback occurring in a deformed portion of the flexible display.

As another related art document using a flexible display, Korean Patent Registration No. 1695206 (hereinafter, referred to as "related art 2") discloses a screen-extendable portable terminal. In related art 2, a flexible display is wound around a cylindrical rotation member provided within a housing.

However, related art 2 does not disclose a component for supporting the bottom surface of the flexible display while the screen of the flexible display wound around the cylindrical rotation member is being extended. Accordingly, the flexible display may be prone to unevenness and sagging.

Further, in related art 2, it is difficult to apply uniform tension to the entire section of the flexible display while the screen of the flexible display wound around the cylindrical rotation member is being extended and reduced. Accordingly, an excessive load may be applied to the flexible display.

In addition, there are difficulties in applying a rollable flexible display to a relatively small-size portable device. In addition, as a radius of curvature is changed in a rolled portion of the flexible display, there may be difficulties in controlling deformation in the entire flexible display.

SUMMARY

Technical Problem

An aspect of the present disclosure is directed to providing, in a flexible display device in which an area of a flexible display exposed at any one side thereof is variable, a new mechanism in which a uniform tension can be applied to the flexible display when the exposed area of the flexible display is increased and reduced.

Another aspect of the present disclosure is directed to providing a flexible display device with a structure in which both a portion of the flexible display that is maintained in shape and a portion that is varied in shape may be stably supported and positioned on a single plane surface or curved surface.

Still another aspect of the present disclosure is directed to providing a flexible display device in which springback occurring in the flexible display at a portion where the flexible display is elastically deformed may be easily controlled.

Yet another aspect of the present disclosure is directed to providing a flexible display device in which a support means configured to support the flexible display may be easily deformed, and a uniform tension may be applied to the support means such that the support means is prevented from being warped.

Still another aspect of the present disclosure is directed to providing a flexible display device in which as the flexible display moves together with the support means configured to support the flexible display, a neutral plane may be in the flexible display at a portion where the flexible display and the support means are deformed.

Yet another aspect of the present disclosure is directed to providing a flexible display device in which lifting and loosening of the flexible display may be prevented, without interfering with the movement of the flexible display.

Still another aspect of the present disclosure is directed to providing a flexible display device in which length compensation for the flexible display and the support means configured to support the flexible display may be achieved.

Solution to Problem

In a flexible display device according to an embodiment of the present disclosure, a driving track may form the shape of a continuous track by itself or together with a moving plate, such that when the moving plate and the driving track move so as to increase or reduce an exposed area of a flexible display that is exposed at any one side of the flexible display, a uniform tension may be applied to the flexible display.

More specifically, the flexible display device according to an embodiment of the present disclosure may include a body, a moving plate, a first pulley, a second pulley, a driving track, and a flexible display.

The first pulley may be coupled to the body so as to be rotatable about a first rotary shaft.

The second pulley may be spaced apart from the first pulley, and may be coupled to the body so as to be rotatable about a second rotary shaft that extends parallel to the first rotary shaft.

The moving plate may be coupled to the body so as to be reciprocally movable along a movement path, wherein the movement path or a tangent line of the movement path may be perpendicular to an arbitrary straight line parallel to the first rotary shaft.

The driving track may be formed such that at least a part thereof is bent, may be disposed to enclose the first pulley and the second pulley, and may be coupled to the moving plate.

The driving track may include a first coupling portion forming one end of the driving track and coupled to the moving plate, and a second coupling portion forming the other end of the driving track and coupled to the moving plate or to the first coupling portion.

A part of the flexible display may be coupled to an outer surface of the moving plate, and another part of the flexible display may be coupled to an outer surface of the driving track.

The moving plate may be coupled so as to be reciprocally movable in a front-rear direction in the body.

The first pulley may be located below the moving plate, and may be coupled to the body so as to be rotatable about a first rotary shaft parallel to a left-right direction.

The second pulley may be located below the moving plate at a position further forward than the first pulley, and may be coupled to the body so as to be rotatable about a second rotary shaft parallel to the first rotary shaft.

The driving track may be formed such that at least a part thereof is bent, may be disposed to enclose the first pulley and the second pulley, and may include a first coupling portion forming one end of the driving track and coupled to a rear end of the moving plate, and a second coupling portion forming the other end of the driving track and coupled to a bottom surface of the moving plate or to the first coupling portion.

The flexible display may include a basic exposed region exposed at a part of the flexible display that overlaps the outer surface of the moving plate, and an additional exposed region exposed at a part of the flexible display that overlaps the outer surface of the driving track.

In the flexible display device according to the embodiment of the present disclosure, as the moving plate moves, a size of a portion of the additional exposed region that is exposed at the same side as the basic exposed region may be varied.

Gear teeth may be repeatedly formed on an inner surface of the moving plate along a movement direction.

The flexible display device according to the embodiment of the present disclosure may further include a driving gear engaged with the gear teeth of the moving plate, and a driving motor configured to rotate the driving gear.

In the flexible display device according to the embodiment of the present disclosure, the driving track may include a chain and a guide plate such that both a portion of the flexible display that is maintained in shape and a portion that is varied in shape are stably supported and positioned on a single plane surface or curved surface.

The chain may form the first coupling portion at one end thereof, and may include a plurality of links rotatably connected to each other about each rotation axis thereof which is parallel to the first rotary shaft.

At least a part of the guide plate may be formed of a metal plate having elasticity. One end of the guide plate may be connected to the chain, and the other end thereof may form the second coupling portion.

The chain may support the flexible display and prevent the flexible display from being warped or uneven.

The guide plate may include a pair of supports forming both side edges of the guide plate along a length direction, and a plurality of first through holes formed to pass through the guide plate between the pair of supports and each having a shape elongated in a width direction.

The chain may be wound around the first pulley and may not be wound around the second pulley, and the guide plate may be wound around the second pulley and may not be wound around the first pulley.

In the flexible display device according to the embodiment of the present disclosure, the additional exposed region may overlap an outer surface of the chain, and an outer surface of a link that overlaps the portion of the additional exposed region that is exposed at the same side as the basic exposed region may form a single plane surface or curved surface together with the outer surface of the moving plate.

In the flexible display device according to this embodiment of the present disclosure, the flexible display may include a back plate formed of a metal plate having elasticity.

In the flexible display device according to the embodiment of the present disclosure, the back plate may include a fixed area and a transformable area such that springback occurring in the flexible display at a portion where the flexible display is elastically deformed is easily controlled.

The fixed area may be a portion overlapping the outer surface of the moving plate.

The transformable area may be a portion overlapping the outer surface of the driving track and comprising a plurality of through holes formed therein, each of the plurality of through holes having a shape elongated in a width direction.

The transformable area may include an edge portion divided into a plurality of edge portions spaced apart from each other to form an edge of the back plate, a plurality of horizontal connecting portions extending from the edge portion in the width direction, and a plurality of first vertical connecting portions formed to connect two horizontal connecting portions that extend from two different edge portions to each other.

The flexible display device according to the embodiment of the present disclosure may further include an elastic body so as to prevent bending of the driving track.

In the flexible display device according to the embodiment of the present disclosure, the first pulley and the second pulley may be configured to relatively move in directions away from each other.

The elastic body may be configured to elastically support any one of the first pulley or the second pulley in a direction away from the other one thereof.

In the flexible display device according to the embodiment of the present disclosure, the flexible display may include a first coupling area coupled to the outer surface of the moving plate, a separated area formed to extend from the first coupling area and not to be coupled to the outer surface of the driving track, and a second coupling area extending from the separated area and coupled to the outer surface of the driving track, such that a neutral plane is in the flexible display at a portion where the flexible display and the support means are deformed.

The flexible display device according to the embodiment of the present disclosure may include a rolling magnet so as to prevent lifting and loosening of the flexible display. The rolling magnet may be provided as a plurality of rolling magnets.

The flexible display device according to the embodiment of the present disclosure may include an inner plate provided under the moving plate and inside the driving track such that an outer surface of the inner plate is parallel to an inner surface of the driving track, and comprising accommodating grooves formed therein.

The rolling magnets may be accommodated in the accommodating grooves in such a way that the rolling magnets do not protrude farther than the outer surface of the inner plate, may be coupled to the inner plate so as to be rotatable about a third rotary shaft parallel to the first rotary shaft, may be configured such that a magnetic force acts between the rolling magnets and the flexible display, and may be formed to have a circular cross section.

The rolling magnets may be formed such that a magnetic force acts between the rolling magnets and the back plate.

The chain may include a first link in which a first link hole is formed, a second link in which a second link hole is formed, and a link pin inserted into the first link hole and the second link hole to connect the first link and the second link.

In the flexible display device according to the embodiment of the present disclosure, the first link hole may be formed as an elongated hole having a relatively greater diameter along a length direction of the chain such that length compensation of the chain, which is a support means for supporting the flexible display, is achieved.

Advantageous Effects of Invention

In the flexible display device according to the embodiments of the present disclosure, the driving track may be disposed to enclose the first pulley and the second pulley, and may include the first coupling portion forming one end of the driving track and coupled to the rear end of the moving plate, and the second coupling portion forming the other end of the driving track and coupled to the bottom surface of the moving plate or to the first coupling portion. Accordingly, the driving track may form the shape of a continuous track by itself or together with the moving plate. In addition, when the exposed area of the flexible display is increased or reduced, uniform tension may be applied to the entire section of the flexible display.

The driving track may include the chain and the guide plate, and a part of the flexible display may be coupled to the moving plate and another part may be coupled to the chain. Accordingly, the flexible display device may have a structure in which both a portion of the flexible display that is maintained in shape and a portion that is varied in shape are stably supported and positioned on a single plane surface or curved surface.

In the flexible display device according to the embodiments of the present disclosure, the back plate of the flexible display may include the fixed area and the transformable area, wherein the transformable area may include the edge portions, the horizontal connecting portions, and the first vertical connecting portions. Accordingly, the flexible display may have a relatively great flexibility in the transformable area, and springback occurring at an elastically deformed portion of the flexible display may be easily controlled.

In the flexible display device according to the embodiments of the present disclosure, the first pulley and the second pulley may be formed to relatively move in directions away from each other, and the flexible display device may further include the elastic body. Accordingly, occurrence of warping in the driving track and the chain may be prevented, and unevenness of the flexible display may also be prevented.

In addition, the flexible display may include the first coupling area coupled to the outer surface of the moving plate, the separated area formed not to be coupled to the outer surface of the driving track, and the second coupling area coupled to the outer surface of the driving track. Accordingly, when the flexible display is deformed while moving together with the driving track supporting the flexible display, the neutral plane may be in the flexible display.

In addition, as the flexible display device according to the embodiments of the present disclosure further includes the inner plate and the rolling magnets, lifting and loosening of the flexible display may be prevented without interrupting sliding of the flexible display.

In the flexible display device according to the embodiments of the present disclosure, the first link hole of the first link which forms the chain may be formed as an elongated hole having a relatively greater diameter along the length direction of the chain, such that the length compensation of the chain is achieved.

More specific effects and additional effects of the flexible display device according to the embodiments of the present disclosure will be described below with reference to the accompanying drawings.

BRIEF DESCRIPTION OF THE DRAWINGS

In FIG. 5b, an enlarged view of some components is also illustrated. In FIGS. 5a and 5b, the body is illustrated by a dotted line.

In FIG. 6a, a chain is illustrated by a dotted line.

In FIG. 7, an enlarged view of a pattern of the guide plate is also illustrated.

In FIG. 8, an enlarged view of a pattern of the back plate is also illustrated.

In FIGS. 9b and 9c, the body is illustrated by a dotted line.

In FIGS. 10a to 10c, the body is illustrated by a dotted line.

FIG. 11b is a perspective view illustrating an inner plate and rolling magnets of FIG. 11a.

In FIG. 12b, the body is illustrated by a dotted line.

DETAILED DESCRIPTION

Figure 1:
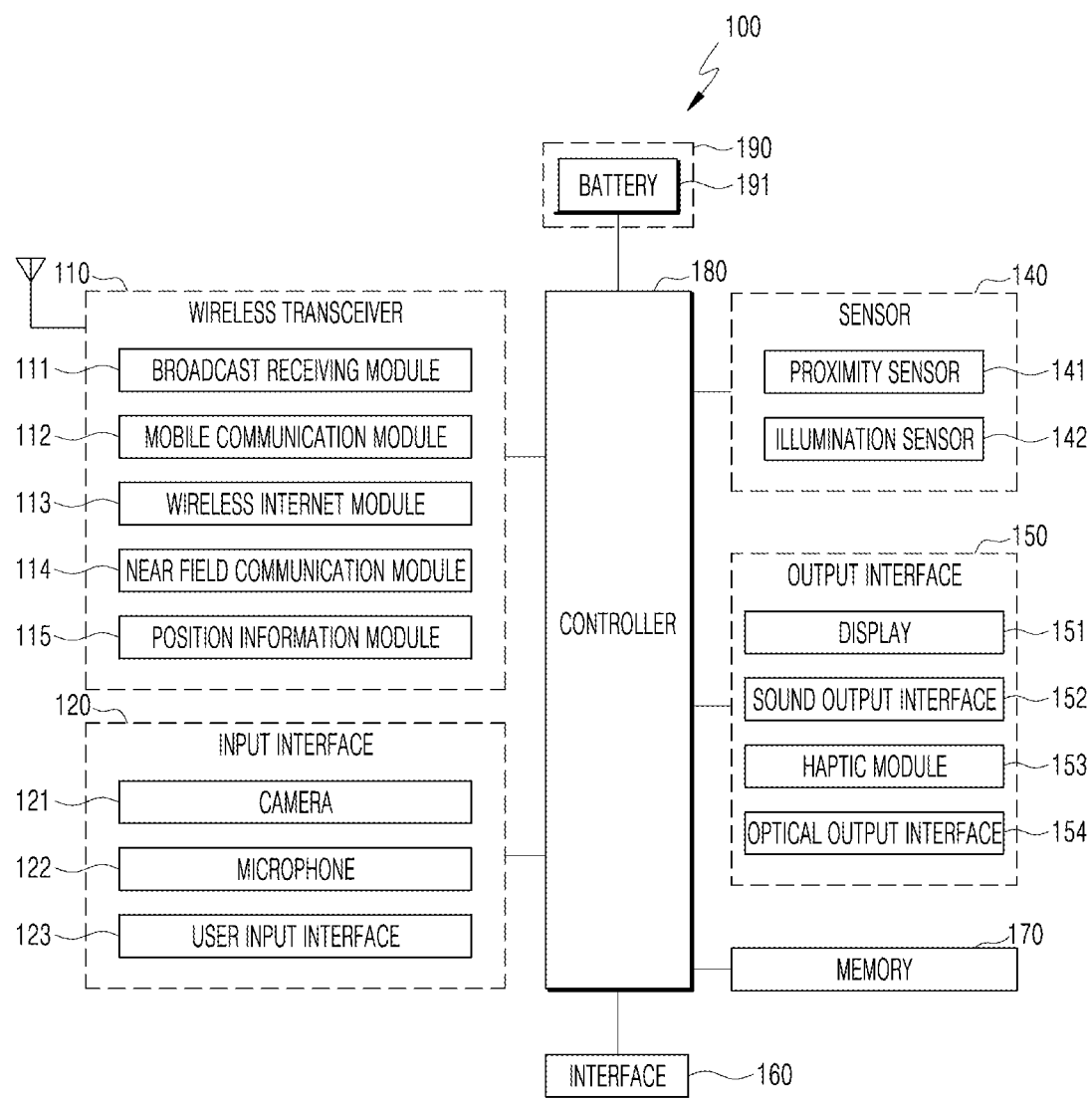
FIG. 1 is a block diagram for explaining a flexible display device according to an embodiment of the present disclosure.

Hereinafter, exemplary embodiments disclosed herein will be described in detail with reference to the accompanying drawings, and like reference numerals designate like elements, and redundant description thereof will be omitted. Suffixes "module" and "unit or portion" for elements used in the following description are merely provided for facilitation of preparing this specification, and thus they are not granted a specific meaning or function. Wherever possible, the same reference numbers will be used throughout the drawings to refer to the same or like parts. In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, and the like, may be used herein to describe various elements, these elements should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

The singular expressions include plural expressions unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A flexible display device (also referred to as a 'display device') described in the present specification may include a mobile terminal such as a portable phone, a smartphone, a laptop computer, a digital broadcasting terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiments disclosed in the present specification may be applied to fixed terminals such as a digital TV, a desktop computer, a digital signage, and the like, except for when the configuration is applied only to a mobile terminal. Hereinafter, in the present disclosure, for the convenience of description, the mobile terminal will be first described as an example of the flexible display device.

FIG. 1 is a block diagram for explaining a mobile terminal 100 related to the present disclosure.

The mobile terminal 100 may include a wireless transceiver 110, an input interface 120, a sensor 140, an output interface 150, an interface 160, a memory 170, a controller 180, and a power supply 190. The elements shown in FIG. 1 are not essential to implement the mobile terminal, and the mobile terminal described in this specification may include more or fewer elements than the above-enumerated elements.

More specifically, the wireless transceiver 110 may include one or more modules that enable wireless communications between the mobile terminal 100 and a wireless communication system, between the mobile terminal 100 and another mobile terminal 100, or between the mobile terminal 100 and an external server. Further, the wireless transceiver 110 may include one or more modules connecting the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive an input of information from a user. Voice data or image data collected by the input interface 120 may be analyzed and processed as a control command of the user.

The sensor 140 may include one or more sensors configured to sense at least one piece of information among information in the mobile terminal, surrounding environment information of the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, or a biometric sensor). Further, the mobile terminal disclosed in the present specification may combine information sensed by at least two sensors from the above-mentioned sensors and may use the combined information.

The output interface 150 may be for generating outputs related to visual, auditory, or tactile senses, and may include at least one of a display 151, a sound output interface 152, a haptic module 153, or an optical output interface 154. The display 151 may form a mutual layer structure with a touch sensor or may be formed integrally with a touch sensor, to be implemented as a touch screen. The touch screen may serve as a user input interface 123 configured to provide an input interface between the mobile terminal 100 and the user, and at the same time, may provide an output interface between the mobile terminal 100 and the user.

The interface 160 may serve as a passage between the mobile terminal 100 and various types of external devices connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. In response to a connection between an external device and the interface 160, the mobile terminal 100 may perform an appropriate control regarding the connected external device.

Further, the memory 170 may store therein data supporting various functions of the mobile terminal 100. The memory 170 may store therein a plurality of application programs (or applications) driven in the mobile terminal 100, data for operations of the mobile terminal 100, and commands. At least some of the application programs may be downloaded from an external server through wireless communication. Further, for the basic functions of the mobile terminal 100 (for example, functions for receiving and making calls and receiving and sending messages), at least some of the application programs may be provided in the mobile terminal 100 from the time of manufacture. The application programs may be stored in the memory 170 and installed on the mobile terminal 100 so as to be driven by the controller 180 to perform operations (or functions) of the mobile terminal 100.

In addition to the operations related to the application programs, the controller 180 may generally control overall operation of the mobile terminal 100. The controller 180 may process a signal, data, or information that is inputted or outputted through the above-described elements or drive the application programs stored in the memory 170 to thereby provide appropriate information or functions to the user or process them.

Further, in order to drive the application programs stored in the memory 170, the controller 180 may control at least one of the elements described with reference to FIG. 1. Moreover, the controller 180 may combine and operate at least two of the elements included in the mobile terminal 100 to drive the application programs.

Under the control of the controller 180, the power supply 190 may be supplied with external power or internal power, and supply power to each element included in the mobile terminal 100. The power supply 190 may include a battery, and the battery may be an internal battery or a replaceable battery.

At least some of the above-described elements may operate in cooperation with each other to implement the operation or control of the mobile terminal or the control method of the mobile terminal according to various embodiments which will be described below. Further, the operation or control of the mobile terminal or the control method of the mobile terminal may be implemented on the mobile terminal by driving at least one application program stored in the memory 170.

Hereinafter, prior to describing various embodiments implemented by the mobile terminal 100 described above, the above-mentioned elements will be described in more detail with reference to FIG. 1.

First, the wireless transceiver 110 will be described. The broadcast receiving module 111 of the wireless transceiver 110 may receive a broadcast signal and/or broadcast-related information from an external broadcast management server through a broadcast channel. The broadcast channel may include a satellite channel and a ground wave channel. The mobile terminal 100 may be provided with two or more broadcast receiving modules for simultaneous reception of at least two broadcast channels or for broadcast channel switching.

The broadcast management server may refer to a server that generates and transmits a broadcast signal and/or broadcast-related information, or a server that is supplied with a previously generated broadcast signal and/or broadcast-related information and transmits the supplied broadcast signal and/or broadcast-related information to the mobile terminal 100. The broadcast signal may include not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one of technical standards for transmission and reception of a digital broadcast signal (or broadcast schemes, such as ISO, IEC, DVB, or ATSC), and the broadcast receiving module 111 may receive the digital broadcast signal by using an appropriate method meeting the technical specification determined by the technical standards.

The broadcast-related information may refer to information related to a broadcast channel, a broadcast program, or a broadcast service provider. The broadcast-related information may also be provided through the mobile communication network. Here, the broadcasting-related information may be received by the mobile communication module 112.

The broadcast-related information may exist in various forms, such as an electronic program guide of digital multimedia broadcasting (DMB) or an electronic service guide of a digital video broadcast-handheld (DVB-H). The broadcast signal and/or the broadcast-related information received through the broadcast receiving module 111 may be stored in the memory 170.

The mobile communication module 112 may transmit/receive a wireless signal to/from at least one of a base station, an external terminal, or a server on a mobile communication network established according to the technical standards for mobile communications or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various forms of data for transmission or reception of a text/multimedia message.

The wireless internet module 113 may refer to a module for wireless Internet connection, and may be installed in the mobile terminal 100 or installed outside the mobile terminal 100. The wireless internet module 113 may be configured to transmit and receive a wireless signal over a communication network according to wireless Internet technologies.

Wireless Internet technologies may include, for example, wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 may transmit and receive data in accordance with at least one wireless Internet technology from among the above-mentioned wireless Internet technologies and wireless Internet technologies that were not described above.

From the viewpoint that the wireless internet connection through, for example, WiBro, HSDPA, HSUPA, GSM, CDMA, WCDMA, LTE, and LTE-A is made through the mobile communication network, the wireless internet module 113, which performs the wireless Internet connection through the mobile communication network, may be understood as one type of the mobile communication module 112.

The near field communication module 114 may be for short-range communications, and may support short-range communications by using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The near field communication module 114 may support wireless communications, over a near-field wireless communication network, between the mobile terminal 100 and the wireless communication system, between the mobile terminal 100 and another mobile terminal 100, or between the mobile terminal 100 and a network in which another mobile terminal 100 (or external server) is located. The near-field wireless communication network may be a wireless personal area network.

Here, the another mobile terminal 100 may be a wearable device (for example, a smart watch, a smart glass, or a head mounted display (HMD)) capable of exchanging data (or interworking) with the mobile terminal 100 according to the present disclosure. The near field communication module 114 may sense (or recognize) the presence of a wearable device that is capable of communicating with the mobile terminal 100, in the vicinity of the mobile terminal 100. Moreover, when the detected wearable device is a device that has been authenticated to communicate with the mobile terminal 100 according to the present disclosure, the controller 180 may transmit at least a portion of data processed in the mobile terminal 100 to the wearable device through the near field communication module 114. Therefore, the user of the wearable device may use, through the wearable device, the data that have been processed in the mobile terminal 100. For example, according to this, when a phone call is received by the mobile terminal 100, the user may receive the phone call through the wearable device, or when a message is received by the mobile terminal 100, the user may check the received message through the wearable device.

The position information module 115 may be a module for obtaining a position (or a current position) of a mobile terminal, and its representative examples may include a global positioning system (GPS) module or a wireless fidelity (Wi-Fi) module. For example, when a GPS module is utilized, the mobile terminal may obtain the position of the mobile terminal by using a signal transmitted from a GPS satellite. As another example, when a Wi-Fi module is utilized, the mobile terminal may obtain the position of the mobile terminal on the basis of information on a wireless access point (AP) which transmits and receives wireless signals to and from the Wi-Fi module. If necessary, the position information module 115 may alternatively or additionally perform a function of another module of the wireless transceiver 110 to obtain data on the position of the mobile terminal. The position information module 115 may be a module used to obtain the position (or the current position) of the mobile terminal, and is not limited to a module that directly calculates or obtains the position of the mobile terminal.

Next, the input interface 120 may be for receiving input of video information (or signal), audio information (or signal), data, or information inputted by the user. For receiving input of the video information, the mobile terminal 100 may include a camera 121 or a plurality of cameras 121. The camera 121 may process an image frame such as a still image or a moving image obtained by an image sensor in a video call mode or a photographing mode. The processed image frame may be displayed on the display 151 or stored in the memory 170. Further, the plurality of cameras 121 provided in the mobile terminal 100 may be arranged to form a matrix structure, and a plurality of pieces of image information having various angles or focal points may be inputted to the mobile terminal 100 through the plurality of cameras 121 forming the matrix structure. In addition, the plurality of cameras 121 may be arranged to form a stereo structure to obtain left and right images used to implement a stereoscopic image.

The microphone 122 may process an external sound signal into electric voice data. The processed voice data may be utilized in various manners in accordance with the function that is being performed in the mobile terminal 100 (or in accordance with an application program that is being executed). Various noise removal algorithms for removing noise generated during the process of receiving the external sound signal may be implemented in the microphone 122.

The user input interface 123 may be for receiving information from the user, and when information is inputted through the user input interface 123, the controller 180 may control operation of the mobile terminal 100 so as to correspond to the inputted information. The user input interface 123 may include a mechanical input interface (or a mechanical key, such as a button located on a front, rear, or side surface of the mobile terminal 100, a dome switch, a jog wheel, a jog switch, etc.) and a touch type input interface. For example, the touch type input interface may be formed as a virtual key, a soft key, or a visual key displayed on a touch screen through a software process, or as a touch key disposed in a part other than the touch screen. The virtual key or the visual key may be displayed on the touch screen in various shapes, and may include, for example, graphics, text, icons, video, or a combination thereof.

The sensor 140 may sense at least one of information in the mobile terminal, information of the surrounding environment of the mobile terminal, or user information, and generate a sensing signal corresponding to sensed information. On the basis of the sensing signal, the controller 180 may control the driving or operation of the mobile terminal 100 or perform data processing, functions, or operations related to an application program installed in the mobile terminal 100. Representative sensors among various sensors that can be included in the sensor 140 will now be described in more detail.

First, the proximity sensor 141 may be a sensor which senses the presence of an object that is approaching a predetermined sensing surface or of nearby objects, by using the force of an electromagnetic field or infrared ray without any mechanical contact. The proximity sensor 141 may be disposed in an internal area of the mobile terminal 100, which is enclosed by the above-described touch screen, or may be disposed in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen may be a position at which the object vertically corresponds to the touch screen when the object proximately touches the touch screen. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximate touch operation and a proximate touch pattern sensed by the proximity sensor 141, and may output visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor may sense a touch (or a touch input) applied to the touch screen (or the display 151) by using at least one of various touch types, such as a resistive film type, a capacitive type, an infrared type, an ultrasonic type, and a magnetic field type.

For example, the touch sensor may be configured to convert a change in pressure that is applied to a specific portion of the touch screen, or a change in capacitance that is generated in a specific portion of the touch screen, into an electrical input signal. The touch sensor may be configured to detect a position where a touch subject which applies a touch onto the touch screen is touched on the touch sensor, the surface area of the touch, the pressure of the touch, and the capacitance at the time of the touch. Here, the touch subject may be an object that applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. Then, the controller 180 may confirm which area of the display 151 was touched. Here, the touch controller may be a separate element from the controller 180, or may be the controller 180 itself.

The controller 180 may perform a different control or the same control depending on a type of a touch subject touching the touch screen (or a touch key provided other than the touch screen). Whether to perform a different control or the same control depending on the type of touch subject may be determined in accordance with a current operating state of the mobile terminal 100 or an application program that is being executed.

The touch sensor and the proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object by using an ultrasonic wave. The controller 180 may be able to calculate a position of a wave generating source from information sensed by an optical sensor and a plurality of ultrasonic sensors. The position of the wave generating source may be calculated by using the property of light that light is much faster than an ultrasonic wave, that is, the time in which light reaches the optical sensor is much shorter than the time in which the ultrasonic wave reaches the ultrasonic sensor. More specifically, the position of the wave generating source may be calculated by using the difference between the arrival time of the ultrasonic wave and the arrival time of the light, with the light as a reference signal.

As an element of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be stacked on a display element and may be configured to scan a motion of the sensing object proximate to the touch screen. More specifically, the photo sensor may be formed by mounting a photo diode and a transistor (TR) in rows/columns to scan an object on the photo sensor by using an electrical signal which changes in accordance with the amount of light applied to the photo diode. That is, the photo sensor may calculate coordinates of a sensing object in accordance with a change in the amount of light, to thereby obtain position information of the sensing object.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

Further, the display 151 may be configured as a stereoscopic display which displays a stereoscopic video.

A three-dimensional display type, such as a stereoscopic type (a glasses type), an autostereoscopic type (a glasses-free type), and a projection type (a holographic type), may be applied to the stereoscopic display.

The sound output interface 152 may output audio data received from the wireless transceiver 110 in, for example, a call signal reception mode, a phone-call mode, a recording mode, a voice recognition mode, and a broadcast reception mode, or audio data stored in the memory 170. The sound output interface 152 may also output a sound signal (for example, a call signal reception sound and a message reception sound) related to a function performed in the mobile terminal 100. The sound output interface 152 may include, for example, a receiver, a speaker, and a buzzer.

The haptic module 153 may generate various tactile effects the user can feel. A representative example of the tactile effect generated by the haptic module 153 may be vibration. An intensity and a pattern of the vibration generated in the haptic module 153 may be controlled by the user or a setting of the controller 180. For example, the haptic module 153 may synthesize vibrations different from one another to output the synthesized vibrations, or sequentially output the different vibrations.

In addition to vibration, the haptic module 153 may generate various tactile effects, such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect through direct contact, but may also be implemented to allow the user to feel a tactile effect through muscular sensation of a finger or an arm. Two or more haptic modules 153 may be provided depending on the configuration of the mobile terminal 100.

The optical output interface 154 may output a signal for providing notification of occurrence of an event by using light of a light source of the mobile terminal 100. Examples of the events generated in the mobile terminal 100 may include, for example, message reception, call signal reception, missed call, alarm, schedule notification, email reception, and information reception through an application.

The signal outputted from the optical output interface 154 may be implemented as the mobile terminal 100 emits light of a single color or a plurality of colors to a front surface or a rear surface thereof. The output of the signal may end as the mobile terminal 100 senses confirmation of the event by the user.

The interface 160 may serve as a passage to all external devices that are connected to the mobile terminal 100. The interface 160 may receive data from an external device or may be supplied with the power source and transmit the supplied power source to each element in the mobile terminal 100, or may transmit data in the mobile terminal 100 to an external device. The interface 160 may include, for example, a wired/wireless headset port, an external charger port, a wired/wireless data port, a memory card port, a port for connecting a device equipped with an identification module, an audio input/output (I/O) port, a video input/output (I/O) port, and an earphone port.

The identification module may be a chip in which various information for authenticating a user right of the mobile terminal 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the mobile terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals inputted from the cradle or the power source may serve as a signal for recognizing that the mobile terminal 100 has been precisely mounted in the cradle.

The memory 170 may store a program for operation of the controller 180, or temporarily store inputted/outputted data (for example, a phone book, a message, a still image, and a moving image). The memory 170 may store data on various patterns of vibration or sound outputted when a touch is inputted onto the touch screen.

The memory 170 may include at least one type of storage medium from among a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to application programs and overall operation of the mobile terminal 100. For example, when the state of the mobile terminal 100 satisfies a predetermined condition, the controller 180 may perform a locking function which limits input of a control command of a user for applications or may release the locking function.

Further, the controller 180 may perform control and processing related to voice call, data communication, and video call, or perform a pattern recognition process by which a handwriting input or a picture drawing input performed on the touch screen may be recognized as a text or an image, respectively. Moreover, the controller 180 may control any one element or a combination of a plurality of the elements described above, to implement various embodiments of the mobile terminal 100 according to the present disclosure which will now be described below.

Under the control of the controller 180, the power supply 190 may be supplied with an external power or an internal power and may supply power required for operating each element. The power supply 190 may include a battery, wherein the battery may be an embedded rechargeable battery or may be detachably coupled to a body of the mobile terminal 100 to be charged.

Further, the power supply 190 may be provided with a connection port, and the connection port may be configured as one example of the interface 160 to which an external charger that supplies power for charging the battery is electrically connected.

As another example, the power supply 190 may be configured to wirelessly charge the battery without using the connection port. Here, the power supply 190 may receive power from an external wireless power transmission device by using one or more of an inductive coupling scheme based on a magnetic induction phenomenon or a magnetic resonance coupling scheme based on an electromagnetic resonance phenomenon.

Various embodiments that will now be described below may be implemented in a recording medium which can be read by a computer or a device similar thereto by using software, hardware, or a combination thereof, for example.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, the display 151 may be two or more displays 151 depending on the implementation of the mobile terminal 100. Here, a plurality of displays 151 may be disposed to be spaced apart from each other or disposed integrally on one surface of the mobile terminal 100, or each of the plurality of displays 151 may be disposed on different surfaces of the mobile terminal 100.

The display 151 may include a touch sensor which senses a touch on the display 151 so as to receive input of a control command in the touch method. When a touch is made on the display 151, the touch sensor may sense the touch, and on the basis of the sensed touch, the controller 180 may generate a control command corresponding to the sensed touch. Contents inputted through the touch method may include letters, numbers, instructions in various modes, and menu items.

The microphone 122 may be configured to receive voice of the user and other sounds. The microphone 122 may be provided in a plurality of positions so as to receive stereo sounds.

The interface 160 may serve as a passage connecting the mobile terminal 100 to external devices. For example, the interface 160 may be at least one of a connection terminal for connection with other devices (for example, an earphone or an external speaker), a port for short-range communications (for example, an infrared port (IrDA port), a Bluetooth port, a wireless LAN port, etc.), or a power supply terminal for supplying power to the mobile terminal 100. The interface 160 may be implemented in the form of a socket accommodating an external card, such as a subscriber identification module (SIM), a user identity module (UIM), and a memory card for storing information.

At least one antenna for wireless communications may be provided in the body of the mobile terminal 100. The antenna may be embedded in the body of the mobile terminal 100 or may be formed in a case. For example, an antenna that forms a part of the broadcast receiving module 111 (see FIG. 1*a*) may be implemented so as to be drawable from the body of the mobile terminal 100. Alternatively, the antenna may be formed as a film type to be attached to an inner surface of a housing, or a case including a conductive material may serve as an antenna.

The power supply 190 (see FIG. 1*a*) for supplying power to the mobile terminal 100 may be provided in the body of the mobile terminal 100. The power supply 190 may be embedded in the body of the mobile terminal 100, or may include a battery 191 outside the body of the mobile terminal 100, the battery 191 being detachable.

The battery 191 may be configured to be supplied with power through a power cable connected to the interface 160. Further, the battery 191 may be configured to be wirelessly charged by a wireless charging device. The wireless charging may be implemented by a magnetic induction scheme or a resonance scheme (magnetic resonance scheme).

An accessory that protects an exterior of the mobile terminal 100 or supports or extends a function thereof may be added to the mobile terminal 100. An example of the accessory may be a cover that covers at least one surface of the mobile terminal 100 or a pouch accommodating the mobile terminal 100. The cover or the pouch, in conjunction with the display 151, may extend the function of the mobile terminal 100. Another example of the accessory may be a touch pen which supports or extends a touch input on the touch screen.

Figure 2A:
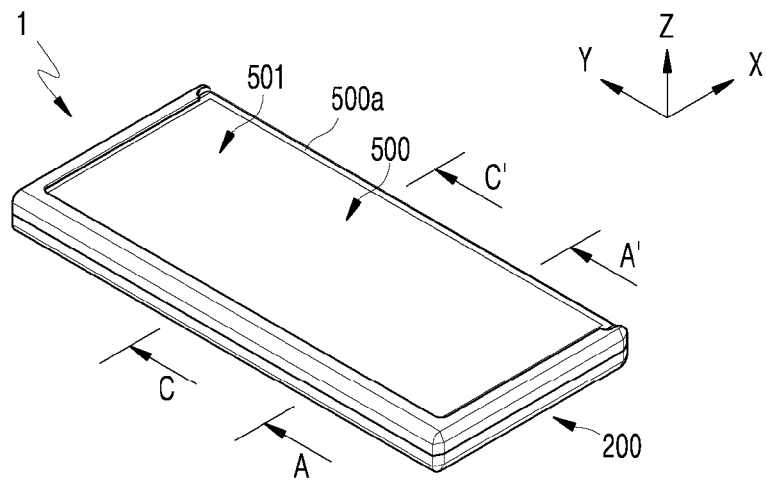
FIG. 2a is a perspective view of a flexible display device according to another embodiment of the present disclosure.
Figure 2B:
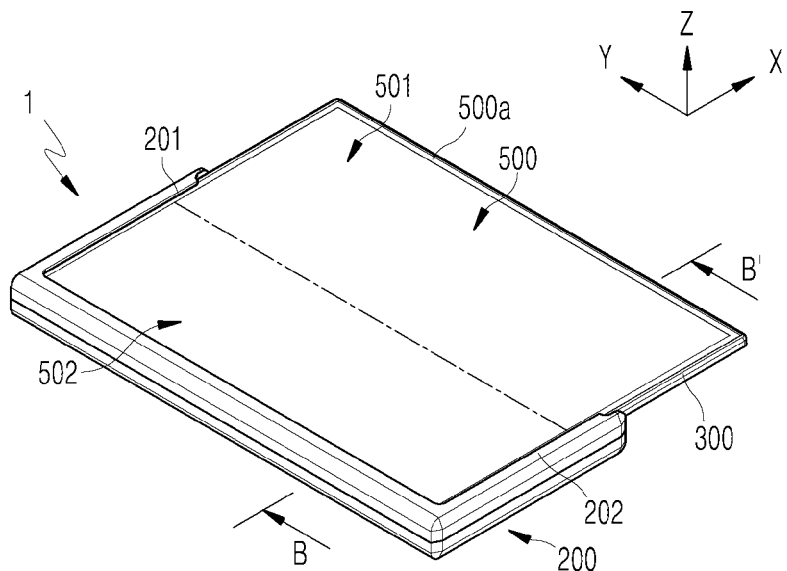
FIG. 2b is a perspective view illustrating the flexible display device of FIG. 2a in a varied state in which an area of a flexible display exposed upwards has been increased.

FIG. 2*a* is a perspective view of a flexible display device 1 according to another embodiment of the present disclosure, and FIG. 2*b* is a perspective view illustrating the flexible display device 1 of FIG. 2*a* in a varied state in which an area of a flexible display 500 exposed upwards has been increased.

Hereinafter, in the description of the embodiments of the present disclosure, an X-direction, a Y-direction, and a Z-direction shown in the drawings refer to directions perpendicular to one another. In the description of the flexible display device 1 according to the embodiments of the present disclosure, a front-rear direction may be a direction parallel to the X-direction, a left-right direction may be a direction parallel to the Y-direction, and an up-down direction may be a direction parallel to the Z-direction.

An inside (or inner side) of the display device 1 means a relative inside of the display device 1, and an outside (or outer side) of the display device 1 means a relative outside of the display device 1.

The flexible display device 1 according to the embodiment of the present disclosure may include a flexible display 500 which is configured to be deformed by an external force.

The deformation may be at least one of warping, bending, folding, twisting, rolling, or spreading of a display module. Such a deformable display module may be referred to as a "flexible display." Here, the flexible display 500 may include a general flexible display, an electronic paper (e-paper), and a combination thereof.

A general flexible display refers to a durable display which, while still having characteristics of existing flat panel displays, is produced on a thin and flexible substrate which can be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information thereon by using a twist ball or electrophoresis using a capsule.

Information displayed on the flexible display 500 may include visual information outputted on a curved surface. The visual information may be implemented as the light emission of unit pixels (sub pixels) that are arranged in a matrix form is independently controlled. The unit pixel refers to a minimum unit for implementing one color.

A portion of the flexible display 500 may be in a bent state, not in a flat state. Here, when an external force is applied to the flexible display 500, a portion of the flexible display 500 may be deformed into a flat state, a less bent state, or a more bent state.

The flexible display 500 may be combined with a touch sensor to implement a flexible touch screen. When a touch input is made on the flexible touch screen, the controller 180 (see FIG. 1) may perform control corresponding to the touch input. The flexible touch screen may be configured to sense a touch input while a portion of the flexible display 500 is in the flat state or in the bent state.

A flexible display device 1 according to the example in which the flexible display 500 is deformable may include a deformation sensor capable of sensing deformation in the flexible display 500. The deformation sensor may be included in the sensor 140 (see FIG. 1).

The deformation sensor may be provided in the flexible display 500 or in a body 200, and may sense information related to deformation of the flexible display 500. Here, the information related to the deformation may include information on a direction in which the flexible display 500 is deformed, information on a degree of the deformation of the flexible display 500, information on a position of the deformation in the flexible display 500, information on a time of the deformation, and information on an acceleration at which the deformed flexible display 500 is recovered. In addition to the above information, various other types of information that can be sensed as the flexible display 500 is bent may also be included.

Further, the controller 180 (see FIG. 1) may change information displayed on the flexible display 500 or generate a control signal for controlling a function of the flexible display device 1, on the basis of the information related to the deformation of the flexible display 500 sensed by the deformation sensor.

The deformation of the flexible display 500 may not be limited to the deformation caused by an external force. For example, when the flexible display 500 is in a state in which a portion thereof is spread, the portion may be deformed to be bent by a command of the user or an application.

The body 200 may form an overall exterior of the display device 1, may be formed to be relatively solid, and may be made of plastic or metal or formed to include plastic or metal. Other components of the display device 1 may be coupled to the body 200.

The body 200 may be formed in various shapes so as to support the components coupled thereto.

The body 200 may have a flat shape as a whole, or may have a curved shape like a curved surface. An inside of the body 200 may be fully filled, or a part of the inside of the body 200 may not be filled. The body 200 may be formed of flat surfaces or curved surfaces, and if there is an edge of the body 200, the edge may form a straight line or a curved line. Further, if there is a vertex in the body 200, the vertex may form a right angle, an acute angle, or an obtuse angle.

For example, as illustrated in FIGS. 2a and 2b, when seen from above (in the opposite direction to the Z-direction), the body 200 may form a quadrangular shape and also a flat shape as a whole.

The flexible display 500 may be coupled to the body 200 such that a part of the flexible display 500 is exposed upwards (Z-direction) and another part is not exposed upwards. Hereinafter, a state in which a part of an outer surface of the flexible display 500 is exposed upwards as illustrated in FIG. 2a will be referred to as a "first state" (see FIG. 2a).

Also, when the flexible display 500 is deformed as a front end portion 500a of the flexible display 500 exposed upwards moves forwards (X-direction), an area of the flexible display 500 that is exposed upwards may be increased. Hereinafter, a state in which the flexible display 500 in the first state moves forward such that the exposed area of the flexible display 500 is increased as illustrated in FIG. 2b will be referred to as a "second state."

As described above, the shape of the display device 1 according to the embodiment of the present disclosure may be varied between the first state and the second state. When seen from above, the display device 1 in the first state may expose a relatively small size (or area) of the flexible display 500, and the display device 1 in the second state may expose a relatively large size (or area) of the flexible display 500.

Figure 2C:
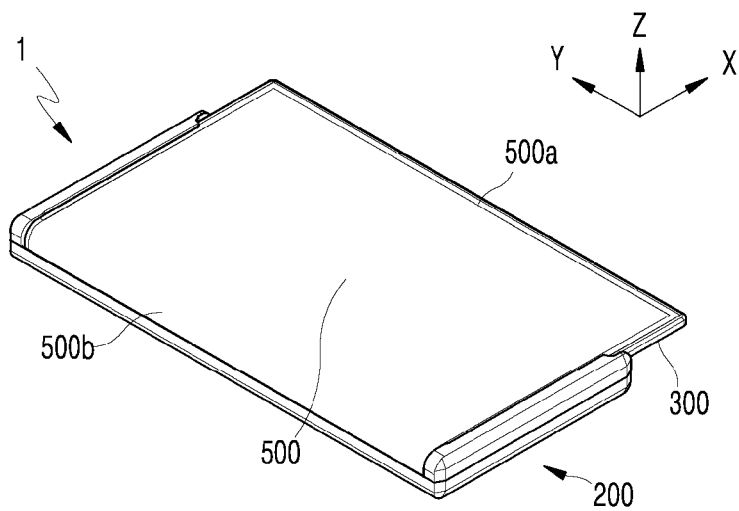
FIG. 2c is a perspective view of a flexible display device according to still another embodiment of the present disclosure.

In the display device 1 according to the embodiment of the present disclosure, the front end portion 500a of the flexible display 500 that is exposed upwards may not be visually blocked, but a rear end portion 500b may be visually blocked (see FIGS. 2a and 2c). That is, a part of the flexible display 500 may be blocked by a rear end edge of the body 200. Here, the flexible display 500 may not be visually exposed at a bottom surface of the display device 1 (i.e., at a lower side of the body 200; in the opposite direction to the Z-direction).

When seen from above, a left edge and a right edge of the body 200 may be formed in a shape for guiding the flexible display 500 such that the flexible display 500 smoothly moves in the front-rear direction.

For example, a left guide 201 may be formed in the left edge of the body 200 along the front-rear direction to be open to a right side, and a right guide 202 may be formed in the right edge of the body 200 along the front-rear direction to be open to a left side.

A left edge portion of the flexible display 500 or a left edge portion of a moving plate 300 (which will be described below) to which the flexible display 500 is coupled may be inserted into the left guide 201. A right edge portion of the flexible display 500 or a right edge portion of the moving plate 300 to which the flexible display 500 is coupled may be inserted into the right guide 202.

The display device 1 according to the embodiment of the present disclosure may be formed in such a shape that the front end portion 500a of the flexible display 500 exposed upwards is not visually blocked, and the rear end portion 500b is not be visually blocked either (see FIG. 2c). That is, an entirely flat portion of the flexible display 500 may be exposed upwards, and a portion of the flexible display 500 that is curved and has a predetermined curvature may be exposed downwards.

Furthermore, at least a part of the flexible display 500 may be visually exposed at the bottom surface of the display device 1 (i.e., at the lower side of the body 200). As the body 200 is formed in such a shape that a lower surface of the body 200 does not visually shield the flexible display 500, the flexible display 500 may also be exposed downwards.

When the display device 1 according to the embodiment of the present disclosure is varied from the first state to the second state (i.e., when the area of the flexible display 500 exposed upwards is increased), and when the display device 1 is varied from the second state to the first state (i.e., when the area of the flexible display 500 exposed upwards is reduced), uniform tension may be applied to the flexible display 500. This will be described in detail below.

Figure 3A:
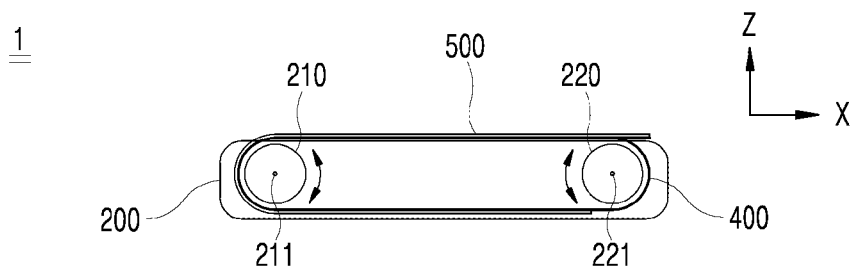
FIG. 3a is a view conceptually and schematically illustrating a flexible display device according to yet another embodiment of the present disclosure.
Figure 3B:
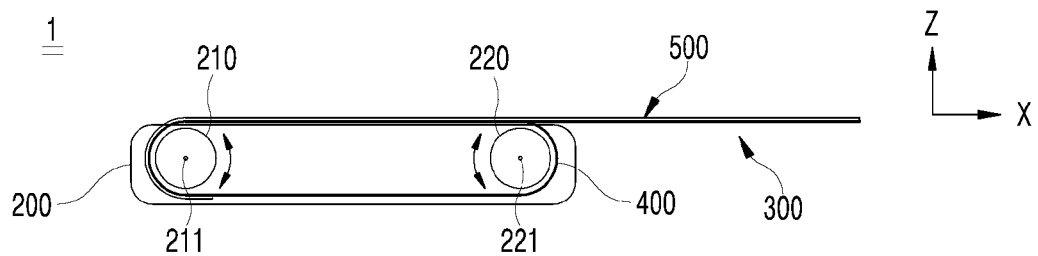
FIG. 3b is a view illustrating the flexible display device of FIG. 3a in a varied state.

FIG. 3a is a view conceptually and schematically illustrating a flexible display device 1 according to yet another embodiment of the present disclosure, and FIG. 3b is a view illustrating the flexible display device 1 of FIG. 3a in a varied state.

Figure 3C:
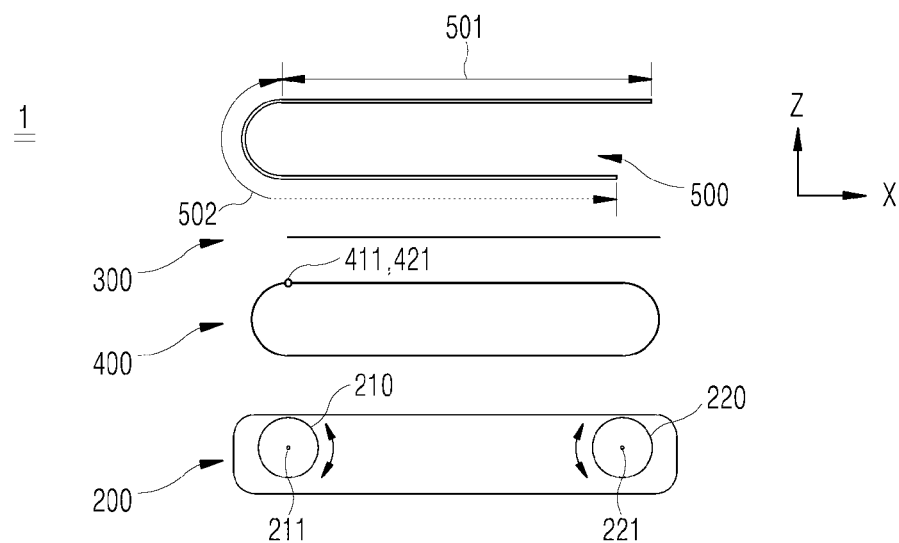
FIG. 3c is a view separately illustrating components of the flexible display device of FIG. 3a, and FIG. 3d is a view separately illustrating components of a flexible display device according to yet another embodiment of the present disclosure.
Figure 3D:
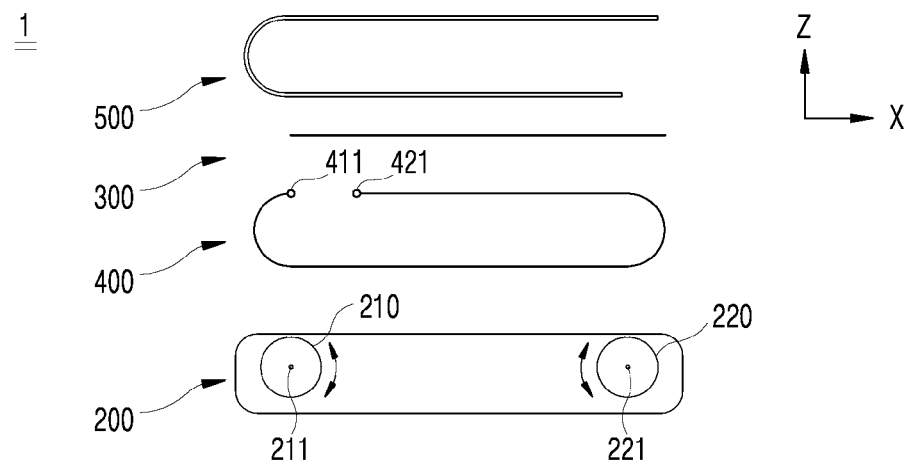

FIG. 3c is a view separately illustrating components of the flexible display device 1 of FIG. 3a, and FIG. 3d is a view separately illustrating components of a flexible display device 1 according to yet another embodiment of the present disclosure.

Figure 4A:
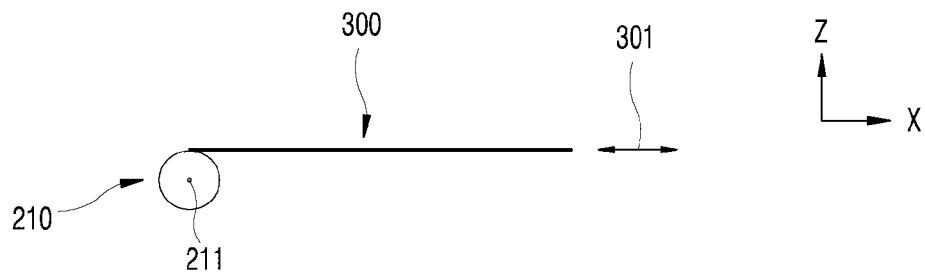
FIG. 4a is a view conceptually and schematically illustrating an operation of some components of a flexible display device according to yet another embodiment of the present disclosure.
Figure 4B:
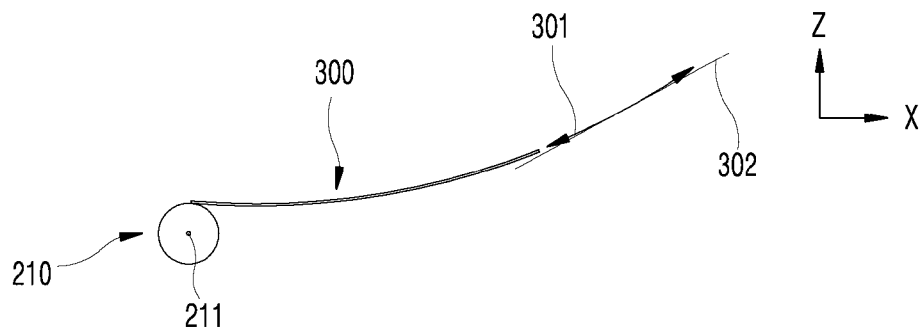
FIG. 4b is a view conceptually and schematically illustrating an operation of some components of a flexible display device according to yet another embodiment of the present disclosure.
Figure 4C:
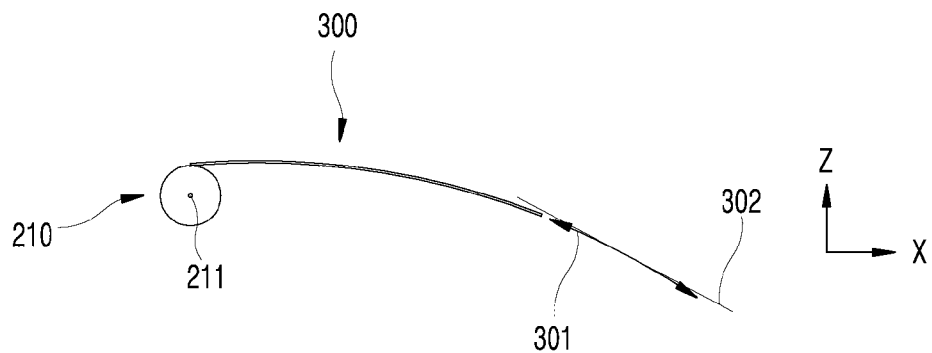
FIG. 4c is a view conceptually and schematically illustrating an operation of some components of a flexible display device according to still another embodiment of the present disclosure.

FIGS. 4a, 4b, and 4c are views conceptually and schematically illustrating operations of some components of a flexible display device 1 according to yet another embodiment of the present disclosure.

The display device 1 according to the embodiment of the present disclosure may include a moving plate 300, a first pulley 210, a second pulley 220, and a driving track 400, in addition to the body 200 and the flexible display 500.

The first pulley 210 may be coupled to the body 200 to be rotatable in a clockwise direction and a counterclockwise direction about a first rotary shaft 211 (hereinafter, referred to as "reciprocally rotatable").

The first pulley 210 may be located below the moving plate 300, and may be coupled to the body 200 so as to be reciprocally rotatable about the first rotary shaft 211 that extends parallel to the left-right direction.

The first pulley 210 may be disposed further rearward than the second pulley 220.

The first pulley 210 may have a cylindrical shape with the first rotary shaft 211 as a central axis. The driving track 400 may be wound around the first pulley 210, and when the driving track 400 is moved (rotated), the first pulley 210 may rotate and facilitate the movement (rotation) of the driving track 400.

The second pulley 220 may be spaced apart from the first pulley 210, and may be coupled to the body 200 so as to be reciprocally rotatable about a second rotary shaft 221 that extends parallel to the first rotary shaft 211.

The second pulley 220 may be located below the moving plate 300 and further forward than the first pulley 210, and may be coupled to the body 200 so as to be reciprocally rotatable about the second rotary shaft 221 which is parallel to the first rotary shaft 211.

The second pulley 220 may have a cylindrical shape with the second rotary shaft 221 as a central axis. The driving track 400 may be wound around the second pulley 220, and when the driving track 400 is moved (rotated), the second pulley 220 may rotate and facilitate the movement (rotation) of the driving track 400.

A rotation direction of the second pulley 220 may coincide with a rotation direction of the first pulley 210.

The moving plate 300 may be coupled so as to be reciprocally movable along a movement path in the body 200.

The moving plate 300 may be formed in a plate shape, and may support a bottom surface of a part of the flexible display 500. The moving plate 300 may be formed in such a shape that an upper surface (an outer surface) thereof is smooth.

The moving plate 300 may be formed in the shape of a plane surface (see FIG. 4a) or a curved surface. When the moving plate 300 is formed in the shape of a curved surface, the moving plate 300 may form a concave surface when seen from above (see FIG. 4b), or may form a convex surface when seen from above (see FIG. 4c).

When the moving plate 300 is formed in the shape of a plane surface, a movement path 301 of the moving plate 300 may be formed along an extended surface of the plane surface formed by the moving plate 300. Here, the movement path 301 may have a shape of a straight line.

When the moving plate 300 is formed in the shape of a plane surface, the movement path 301 of the moving plate 300 may be perpendicular to an arbitrary straight line that is parallel to the first rotary shaft 211.

Specifically, the moving plate 300 may be coupled so as to be reciprocally movable in the front-rear direction in the body 200.

When the moving plate 300 is formed in the shape of a curved surface, the movement path 301 of the moving plate 300 may be formed along an extended surface of the curved surface formed by the moving plate 300. Here, the movement path 301 may have a shape of a curve.

When the moving plate 300 is formed in the shape of a curved surface, an arbitrary tangent line 302 of the movement path 301 of the moving plate 300 may be perpendicular to an arbitrary straight line that is parallel to the first rotary shaft 211.

The driving track 400 may be formed such that at least a part thereof is bendable, and may be disposed to enclose the first pulley 210 and the second pulley 220. That is, an inner surface of a part of the driving track 400 may be in close contact with an outer surface of the first pulley 210, and an inner surface of another part of the driving track 400 may be in close contact with an outer surface of the second pulley 220.

In the display device 1 according to an embodiment of the present disclosure, the driving track 400 disposed around the first pulley 210 and the second pulley 220 may be formed such that a predetermined tension is applied to the driving track 400 and the driving track 400 does not become loose as a whole. The tension may be adjusted depending on a length of the driving track 400, a distance between the first pulley 210 and the second pulley 220, the presence of an additional pulley, and the like.

The driving track 400 may include a first coupling portion 411 which forms one end of the driving track 400, and a second coupling portion 421 which is connected to the first coupling portion 411 and forms the other end of the driving track 400.

The driving track 400 may be formed in the shape of a closed loop (circulating loop) by itself. That is, the driving track 400 may be formed in the shape of a loop as a whole without any cut in the middle (see FIG. 3c). Here, the first coupling portion 411 may be coupled to the moving plate 300, and the second coupling portion 421 may be coupled to the first coupling portion 411. As described above, the first coupling portion 411 and the second coupling portion 421 may be coupled to each other, and the driving track 400 may form the shape of a continuous track by itself.

Alternatively, the driving track 400 may be formed in the shape of a loop having a disconnected portion in the middle thereof (see FIG. 3d). Here, the first coupling portion 411 may be coupled to the moving plate 300, and the second coupling portion 421 may also be coupled to the moving plate 300. That is, as the first coupling portion 411 and the second coupling portion 421 are separated and spaced apart from each other, the driving track 400 may form a continuous track together with the moving plate 300 by being coupled to the moving plate 300.

In the description of the display device 1 according to the embodiment of the present disclosure, a length direction of the driving track 400 may be an arbitrary direction perpendicular to the left-right direction (a direction parallel to the Y-direction), or an arbitrary direction in which the driving track 400 rotates about the first rotary shaft 211 or the second rotary shaft 221.

In the description of the display device 1 according to the embodiment of the present disclosure, the length direction of the driving track 400 may refer to a direction that extends from the first coupling portion 411 to the second coupling portion 421 via a portion of the driving track 400 that is wound around the first pulley 210 and a portion that is wound around the second pulley 220, or may be an opposite direction thereto.

In the display device 1 according to the embodiment of the present disclosure, the flexible display 500 may be integrally formed as one display, wherein a part of the flexible display 500 may be coupled to an outer surface of the moving plate 300, and another part of the flexible display 500 may be coupled to an outer surface of the driving track 400.

In a detailed embodiment, the flexible display 500 may be configured such that a middle portion of the flexible display 500 is bent, a part of the flexible display 500 in an upper side thereof faces upward, and a part of the flexible display 500 in a lower side thereof faces downward.

In the display device 1 according to the embodiment of the present disclosure, the flexible display 500 may be formed so as not to overlap with itself, and an entire length of the flexible display 500 (i.e., a length measured when the flexible display 500 is completely spread out) may be shorter than an entire length of the driving track 400 (i.e., a length measured when the driving track 400 is completely spread out).

In the display device 1 according to the embodiment of the present disclosure, when the display device 1 is varied from the first state to the second state (i.e., when the area of the flexible display 500 exposed upwards is increased), the moving plate 300 may move in the forward direction, and the driving track 400 in FIG. 3a may be pulled in the clockwise direction. Here, a uniform tension may be applied to the entire section of the driving track 400, and thus the driving track 400 may not be warped even in a partial section thereof.

Here, the flexible display 500, which is coupled to the outer surface of the moving plate 300 and the outer surface of the driving track 400, may move together with the moving plate 300 and the driving track 400, and a tension applied to the flexible display 500 may be maintained constant.

In the display device 1 according to the embodiment of the present disclosure, when the display device 1 is varied from the second state to the first state (i.e., when the area of the flexible display 500 exposed upwards is decreased), the moving plate 300 may move in the rearward direction, and the driving track 400 in FIG. 3b may be pulled in the counterclockwise direction. Here, a uniform tension may be applied to the entire section of the driving track 400.

Here, the flexible display 500, which is coupled to the outer surface of the moving plate 300 and the outer surface of the driving track 400, may move together with the moving plate 300 and the driving track 400, and a tension applied to the flexible display 500 may be maintained constant.

Figure 5A:
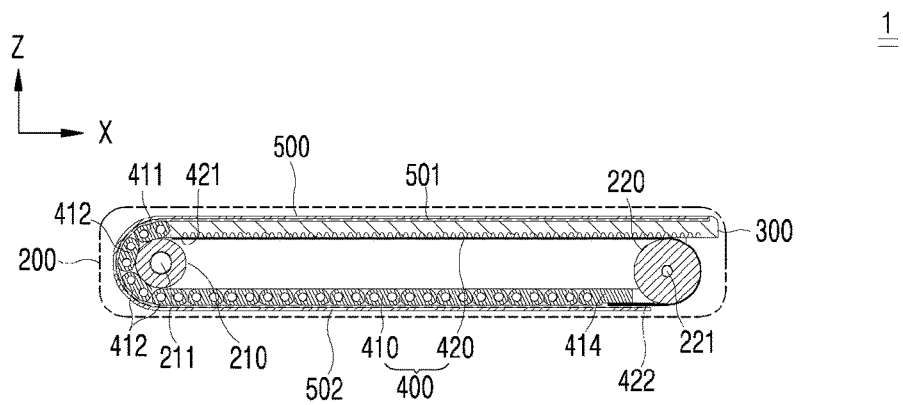
FIG. 5a is a cross-sectional view of the flexible display device illustrated in FIG. 2a taken along the line A-A'.
Figure 5B:
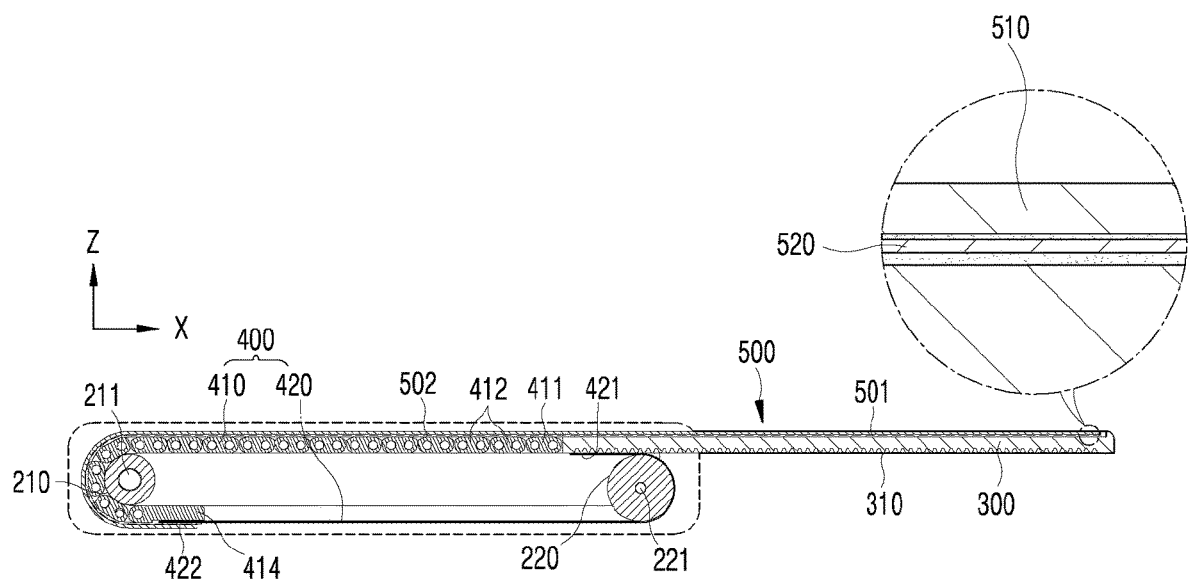
FIG. 5b is a cross-sectional view of the flexible display device illustrated in FIG. 2b taken along the line B-B'.

FIG. 5a is a cross-sectional view of the flexible display device 1 illustrated in FIG. 2a taken along the line A-A', and FIG. 5b is a cross-sectional view of the flexible display device 1 illustrated in FIG. 2b taken along the line B-B'.

Figure 6A:
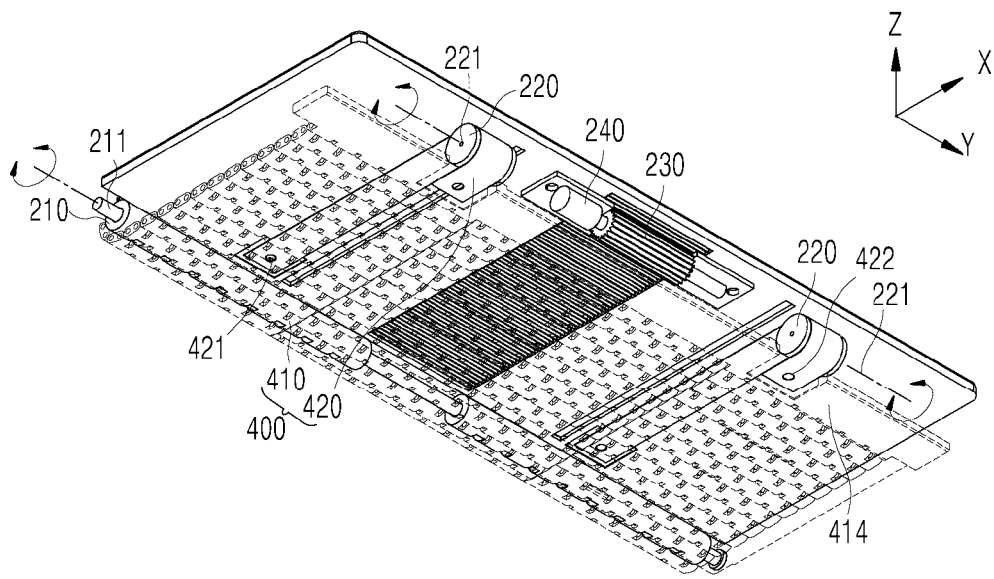
FIG. 6a is a perspective view of some components of the flexible display device illustrated in FIG. 2a seen from below.
Figure 6B:
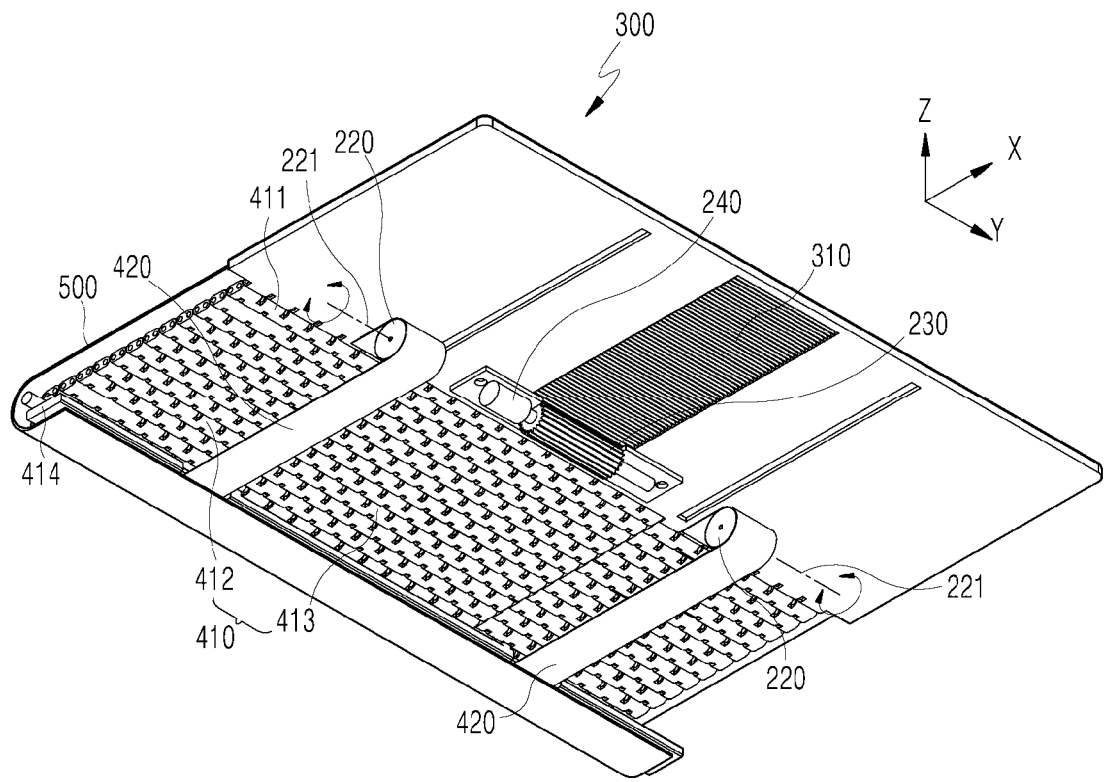
FIG. 6b is a perspective view of some components of the flexible display device illustrated in FIG. 2b seen from below.

FIG. 6a is a perspective view of some components of the flexible display device 1 illustrated in FIG. 2a seen from below, and FIG. 6b is a perspective view of some components of the flexible display device 1 illustrated in FIG. 2b seen from below.

Figure 7:
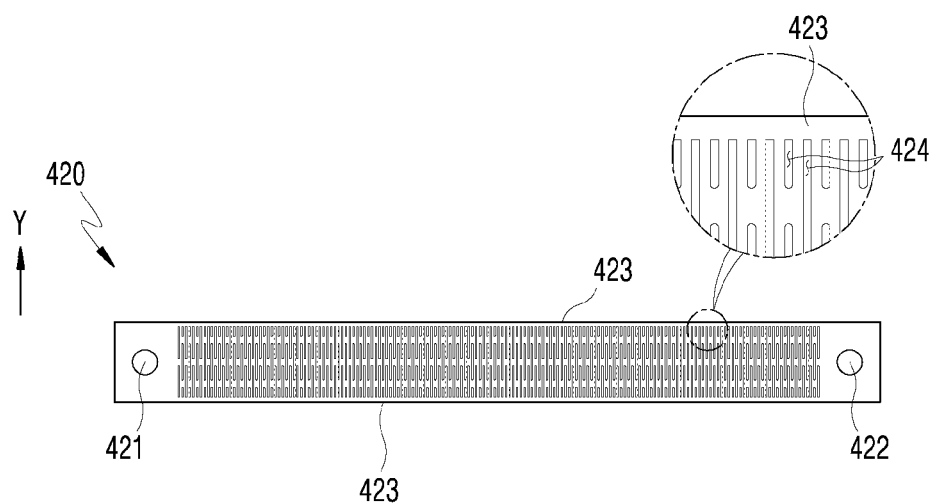
FIG. 7 is a plane view of a guide plate illustrated in FIG. 6b.

FIG. 7 is a plane view of the guide plate 420 illustrated in FIG. 6b. In FIG. 7, an enlarged view of a pattern of the guide plate 420 is also illustrated.

Figure 8:
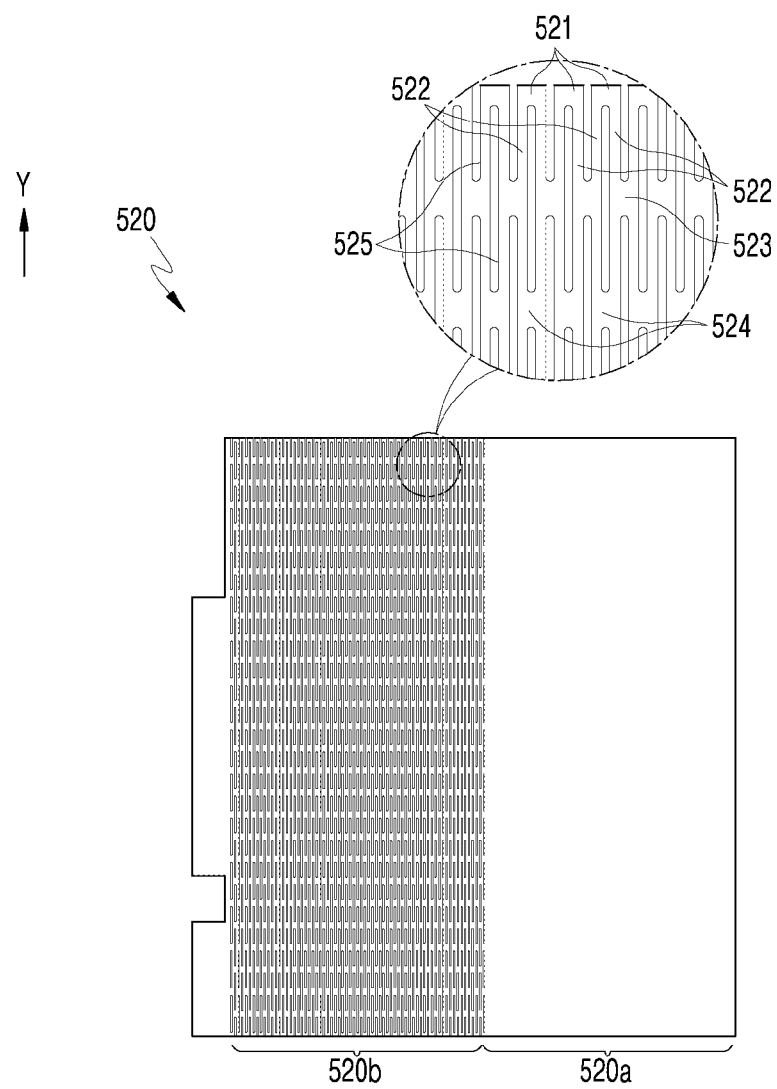
FIG. 8 is a plane view of a back plate illustrated in FIG. 5b.

FIG. 8 is a plane view of a back plate 520 illustrated in FIG. 5b. In FIG. 8, an enlarged view of a pattern of the back plate 520 is also illustrated.

In the description of the display device 1 according to the embodiment of the present disclosure, a length direction of the flexible display 500 may be an arbitrary direction perpendicular to the left-right direction (a direction parallel to the Y-direction), or an arbitrary direction in which the flexible display 500 rotates about the first rotary shaft 211.

In the display device 1 according to the embodiment of the present disclosure, the flexible display 500 may include a basic exposed region 501 and an additional exposed region 502 (see FIGS. 2a, 2b, and 3c).

The basic exposed region 501 may be a region of the flexible display 500 that overlaps the outer surface of the moving plate 300 and is exposed. The basic exposed region 501 may be an area of the flexible display 500 that is exposed upwards while the display device 1 is in the first state.

The additional exposed region 502 may be a region of the flexible display 500 that overlaps the outer surface of the driving track 400 and is exposed. The additional exposed region 502 may be an area of the flexible display 500 that is exposed upwards while the display device 1 is in the second state, excluding the basic exposed region 501.

The display device 1 according to the embodiment of the present disclosure may be configured such that as the moving plate 300 is moved, the size of the additional exposed region 502 that is exposed together with the basic exposed region 501 at the same side varies.

In the display device 1 according to the embodiment of the present disclosure, the moving plate 300 may be made of a relatively rigid material such that the shape thereof is maintained. The moving plate 300 may be made of metal or plastic, or formed to include metal or plastic.

In the display device 1 according to the embodiment of the present disclosure, gear teeth 310 may be repeatedly formed on an inner surface (a lower surface) of the moving plate 300 along a movement direction. That is, the gear teeth 310 may be repeatedly formed on the lower surface of the moving plate 300 along the front-rear direction.

Further, the display device 1 according to the embodiment of the present disclosure may further include a driving gear 230 and a driving motor 240.

The driving gear 230 may be configured to be engaged with the gear teeth 310 of the moving plate 300.

The driving motor 240 may be configured as a general motor rotated by electricity, and may be configured as a step motor. The driving motor 240 may be directly coupled to the driving gear 230 to rotate the driving gear 230, or may be configured to rotate the driving gear 230 by medium of another gear.

In the display device 1, the driving gear 230 may be located further forward than the first pulley 210, and the driving gear 230 may be formed at a position similar to the second pulley 220 with respect to the front-rear direction.

In the display device 1 according to the embodiment of the present disclosure, for the purpose of smooth movement of the moving plate 300, the gear teeth of the moving plate 300 and the driving gear 230 may be configured to have a gear module of 0.3 mm.

In the display device 1 according to the embodiment of the present disclosure, the driving track 400 may include a chain 410 and a guide plate 420.

The chain 410 may be formed of a relatively rigid material such that the shape thereof is maintained. The chain 410 may be made of metal or plastic, or formed to include the same.

The chain 410 may include a plurality of links 412 and 413 which are connected to each other.

One end of the chain 410, in the length direction, may be coupled to the moving plate 300, and the other end thereof may be coupled to the guide plate 420. In the chain 410, excluding a portion coupled to the moving plate 300 and a portion coupled to the guide plate 420, the plurality of links 412 and 413 which are continuously arranged along the length direction may be formed to be identical to each other in terms of shape. Each of the plurality of links 412 and 413 may be formed to have a generally uniform cross section along the left-right direction.

Each of the plurality of links 412 and 413 forming the chain 410 may have a constant thickness (i.e., a width of the links 412 and 413 in the up-down direction measured when the links 412 and 413 are located along the front-rear direction), and the thickness of each of the plurality of links 412 and 413 may be equal to or similar to a thickness of the moving plate 300 (i.e., a width of the moving plate 300 in the up-down direction).

The portion of the chain 410 that is coupled to the moving plate 300 may be the first coupling portion 411, wherein the first coupling portion 411 may be rotatably coupled to an immediately adjacent link and may also be rotatably coupled to the moving plate 300. Here, a thickness of the first coupling portion 411 may be equal to or similar to the thickness of the moving plate 300.

When the first coupling portion 411 is rotatably coupled to the moving plate 300, a rotation axis thereof may be parallel to the first rotary shaft 211, and when the first coupling portion 411 is rotatably coupled to the immediately adjacent link, a rotation axis thereof may be parallel to the first rotary shaft 211.

The first coupling portion 411 may be formed to be reciprocally movable in the front-rear direction in the body 200, and the first coupling portion 411 may be positioned over a line segment that connects the first rotary shaft 211 and the second rotary shaft 221.

The chain 410 may be bent in a portion thereof that is wound around the first pulley 210, and spread out flat in another portion thereof.

A first intermediate coupling portion 414 of the chain 410, which is a portion of the chain 410 that is coupled to the guide plate 420, may be rotatably coupled to an immediately adjacent link thereof.

The first intermediate coupling portion 414 may be formed to be reciprocally movable in the front-rear direction in the body 200, and may be positioned below the line segment that connects the first rotary shaft 211 and the second rotary shaft 221.

At least a part of the guide plate 420 may be formed of a metal plate having elasticity. The guide plate 420 may be formed of a super elastic metal.

The guide plate 420 may be made of a super elastic wire, a Flexinol wire, or a shape-memory alloy wire, or may be formed to include the same.

The guide plate 420 may be formed in the shape of a relatively thin plate. The guide plate 420 may be formed to have an arbitrary thickness between 0.05 and 0.2 mm, and may be formed to have a thickness of 0.1 mm.

Two or more guide plates 420 may be provided in one driving track 400.

One end of the guide plate 420 may be connected to the chain 410, and the other end thereof may form the second coupling portion 421.

A second intermediate coupling portion 422 of the guide plate 420, which is a portion of the guide plate 420 that is coupled to the chain 410, may be coupled to the first intermediate coupling portion 414, and may be closely coupled to a bottom surface of the first intermediate coupling portion 414. The first intermediate coupling portion 414 and the second intermediate coupling portion 422 may be coupled to each other by a fastening means such as a bolt, or may be coupled to each other by hooking, adhering, or welding.

The second coupling portion 421 of the guide plate 420 may be coupled to the first coupling portion 411 or coupled to the moving plate 300.

When the second coupling portion 421 is coupled to the moving plate 300, the second coupling portion 421 may be closely coupled to a bottom surface of the moving plate 300. The second coupling portion 421 and the moving plate 300 may be coupled to each other by a fastening means such as a bolt, or may be coupled to each other by hooking, adhering, or welding.

When the second coupling portion 421 is coupled to the moving plate 300, the second coupling portion 421 may be coupled to a portion of the moving plate 300 that is relatively close to a rear end of the moving plate 300. That is, the second coupling portion 421 may be coupled the moving plate 300 at a portion of the moving plate 300 that is further rearward than a center of the moving plate 300.

The guide plate 420 may include a pair of supports 423 and first through holes 424.

The supports 423 may be portions of the guide plate 420 that form both side edges along a length direction of the guide plate 420. The supports 423 may be formed in the shape of a straight line as a whole.

The first through holes 424 may be through holes formed between the supports 423 to pass through the guide plate 420 in a thickness direction thereof, wherein each of the first through holes 424 may be formed in a shape elongated along a width direction of the guide plate 420. The first through holes 424 may be repeatedly formed along the length direction of the guide plate 420, and may also be repeatedly formed along the width direction of the guide plate 420.

As the first through holes 424, each having the shape elongated along the width direction, are repeatedly formed in the guide plate 420, the guide plate 420 may be easily bent about a rotation axis formed along the width direction.

As the guide plate 420 includes the supports 423 and the first through holes 424, when the guide plate 420 is bent about the second rotary shaft 221 of the second pulley 220, the guide plate 420 may be elastically deformed relatively easily, and springback in the guide plate 420 may be easily controlled.

In the display device 1 according to the embodiment of the present disclosure, the flexible display 500 may be formed by laminating a plurality of layers, wherein a display layer 510 on which an image is displayed may be formed on an outer side of the flexible display 500, and the back plate 520 may be formed on a lower side of the flexible display 500.

The back plate 520 may be formed of a metal plate having elasticity. The back plate 520 may be formed to include a super elastic metal.

The back plate 520 may facilitate elastic deformation and elastic recovery of the flexible display 500.

The back plate 520 may be formed in the shape of a relatively thin plate. The back plate 520 may be formed to have an arbitrary thickness between 0.05 and 0.2 mm, and may be formed to have a thickness of 0.1 mm.

In the display device 1 according to the embodiment of the present disclosure, the back plate 520 may be formed of an integral metal plate as a whole, and may be divided into two or more areas.

Specifically, the back plate 520 may include a fixed area 520a and a transformable area 520b.

The fixed area 520a may be an area overlapping the outer surface of the moving plate 300. The moving plate 300, which overlaps the fixed area 520a, may be formed in the shape of a flat metal plate as a whole.

On the fixed area 520a, the back plate 520 may be bilaterally symmetrical.

The transformable area 520b may be an area overlapping the outer surface of the driving track 400. In the transformable area 520b, a plurality of second through holes 525 may be formed in shapes elongated in the width direction (left-right direction). That is, in a portion of the back plate 520 that overlaps the driving track 400, i.e., in the transformable area 520b, the plurality of second through holes 525 may be formed to pass through the transformable area 520b in a thickness direction thereof.

On the transformable area 520b, the back plate 520 may be bilaterally symmetrical.

The transformable area 520b in which the plurality of second through holes 525 are formed may include an edge portion 521, horizontal connecting portions 522, and first vertical connecting portions 523.

The edge portion 521 may be divided into a plurality of edge portions 521 to form a left edge and a right edge of the back plate 520. The plurality of edge portions 521 may be spaced apart from each other, and each of the plurality of edge portions 521 may have a predetermined length along the length direction.

The horizontal connecting portions 522 may extend from the edge portions 521 in the width direction. Two horizontal connecting portions 522 may extend from one edge portion 521.

One first vertical connecting portion 523 may connect two horizontal connecting portions 522 that extend from two different edge portions 521. That is, one first vertical connecting portion 523 may connect two adjacent horizontal connecting portions 522 that extend from two adjacent edge portions 521. The first vertical connecting portions 523 may be repeatedly formed along the width direction (left-right direction), and may be spaced apart from each other at regular intervals.

Second vertical connecting portions 524 may be formed in the transformable area 520b, and one second vertical connecting portion 524 connects two horizontal connecting portions 522 that extend from a single edge portion 521. The second vertical connecting portions 524 may be repeatedly formed along the width direction (left-right direction), and may be spaced apart from each other at regular intervals.

As described above, as the second through holes 525, having shapes elongated in the width direction, are repeatedly formed in the transformable area 520b, the transformable area 520b may be easily bent about a rotation axis in the width direction.

When a tensile force, as an external force, is applied to the transformable area 520b in the length direction, the transformable area 520b may be deformed in such a way that the edge portions 521 and the first vertical connecting portions 523 move away from each other in the length direction with respect to the horizontal connecting portions 522, and accordingly, an overall length of the transformable area 520b may be increased. When the external force is removed, the transformable area 520b may be elastically restored to its original state.

In addition, when a tensile force, as an external force, is applied to the transformable area 520b in the length direction, the transformable area 520b may be deformed in such a way that the first vertical connecting portions 523 and the second vertical connecting portions 524 move away from each other in the length direction with respect to the horizontal connecting portions 522, and accordingly, the overall length of the transformable area 520b may be increased. When the external force is removed, the transformable area 520b may be elastically restored to its original state.

As the back plate 520 includes the transformable area 520b, the area of the flexible display 500 that overlaps the outer surface of the driving track 400 may be more flexibly deformed. Further, as the back plate 520 includes the transformable area 520b, when the flexible display 500 is bent about the first rotary shaft 211 of the first pulley 210, elastic deformation of the flexible display 500 may be easily made, and springback in the flexible display 500 may be easily controlled.

In addition, as the back plate 520 includes the transformable area 520b, the flexible display 500 may be elastically deformed within a predetermined range along the length direction.

Figure 9A:
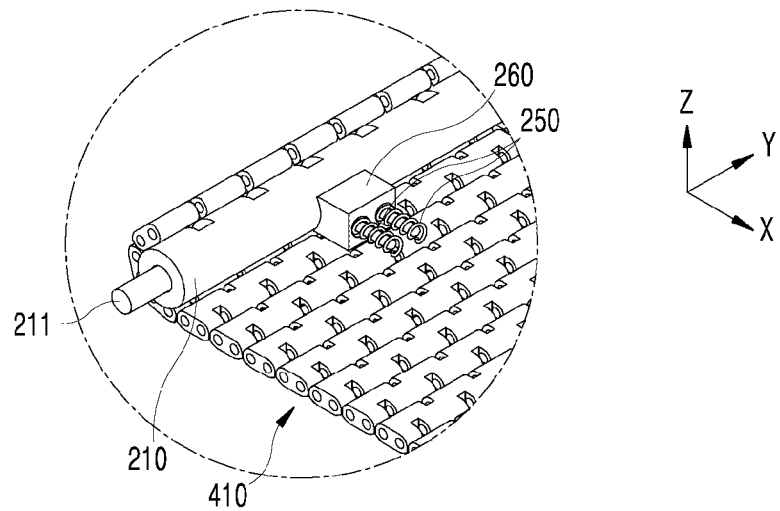
FIG. 9a is a perspective view illustrating some components of a flexible display device according to yet another embodiment of the present disclosure.
Figure 9B:
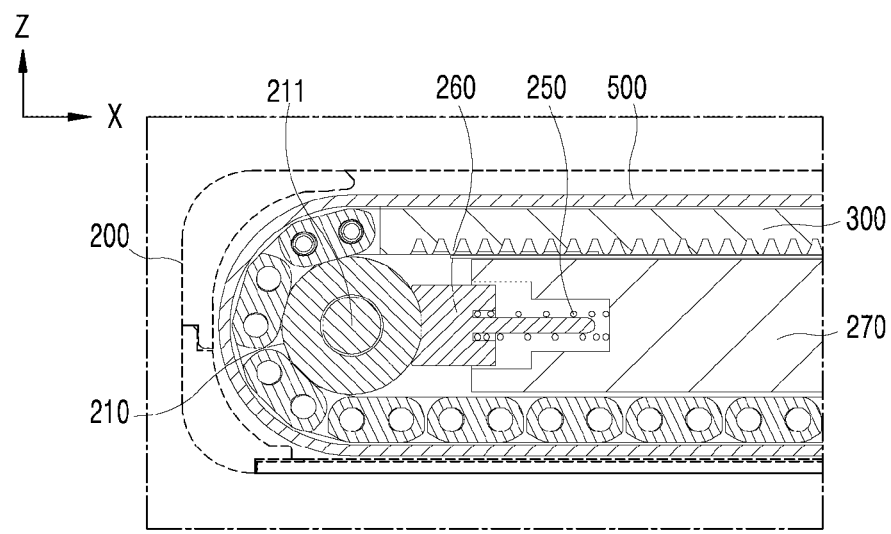
FIGS. 9b and 9c are cross-sectional views of the flexible display device of FIG. 9a cut at different positions.
Figure 9C:
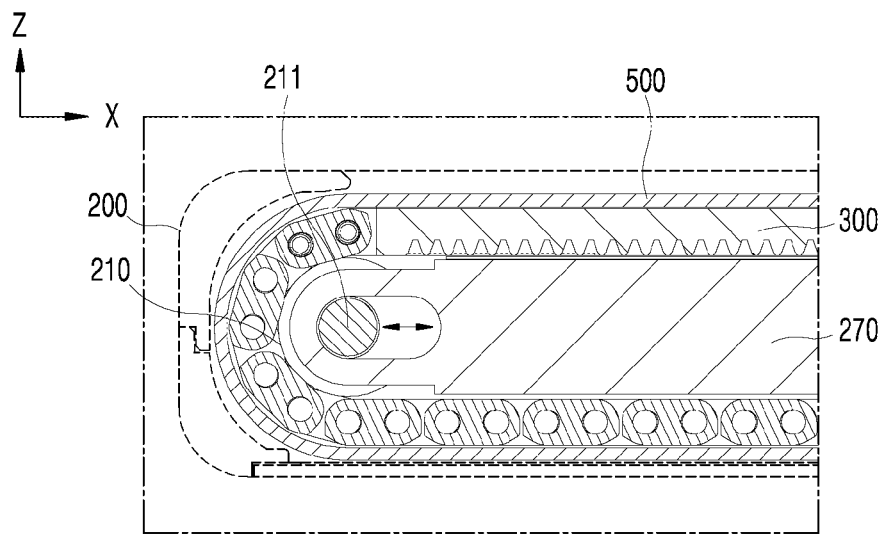

FIG. 9a is a perspective view illustrating some components of a flexible display device 1 according to yet another embodiment of the present disclosure, and FIGS. 9b and 9c are cross-sectional views of the flexible display device 1 of FIG. 9a cut at different positions.

In the display device 1 according to the embodiment of the present disclosure, the first pulley 210 and the second pulley 220 may be configured to move relative to each other in directions away from each other.

The display device 1 may further include an elastic body 250 configured to elastically support any one of the first pulley 210 and the second pulley 220 such that the any one of the first pulley 210 and the second pulley 220 is moved away from the other one thereof.

Referring to the embodiment of the present disclosure, the second pulley 220 may be configured such that a rotation axis thereof (i.e., the second rotary shaft 221) is located in a fixed position with respect to the body 200, and the first pulley 210 may be configured such that a rotation axis thereof (i.e., the first rotary shaft 211) is reciprocally movable in the front-rear direction with respect to the body 200. Here, the elastic body 250 may be configured to apply pressure to the first pulley 210 such that the first pulley 210 is moved away from the second pulley 220.

The elastic body 250 may be formed in the shape of a conventional coil spring. The elastic body 250 may be configured to store an elastic force in a compressed state, and apply pressure to the first pulley 210 in this state.

In the embodiment of the present disclosure, the elastic body 250 may be configured to directly apply pressure to the first pulley 210. Alternatively, the elastic body 250 may be configured to apply pressure to the first pulley 210 by medium of a pusher 260.

Accordingly, uniform tension may be applied to the entire section of the driving track 400 without the driving track 400 becoming loose, and with this, uniform tension may be applied to the flexible display 500, too.

The elastic body 250 and the pusher 260 may operate by being supported within the body 200. For example, the elastic body 250 and the pusher 260 may operate by being supported by an inner plate 270, which will be described below.

Figure 10A:
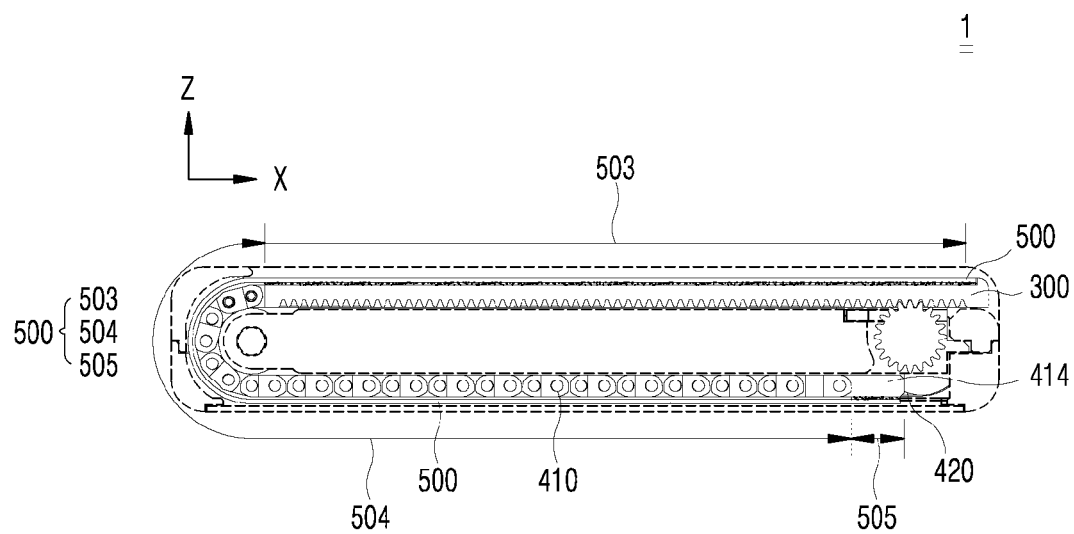
FIG. 10a is a cross-sectional view of the flexible display device illustrated in FIG. 2a taken along the line C-C'.
Figure 10B:
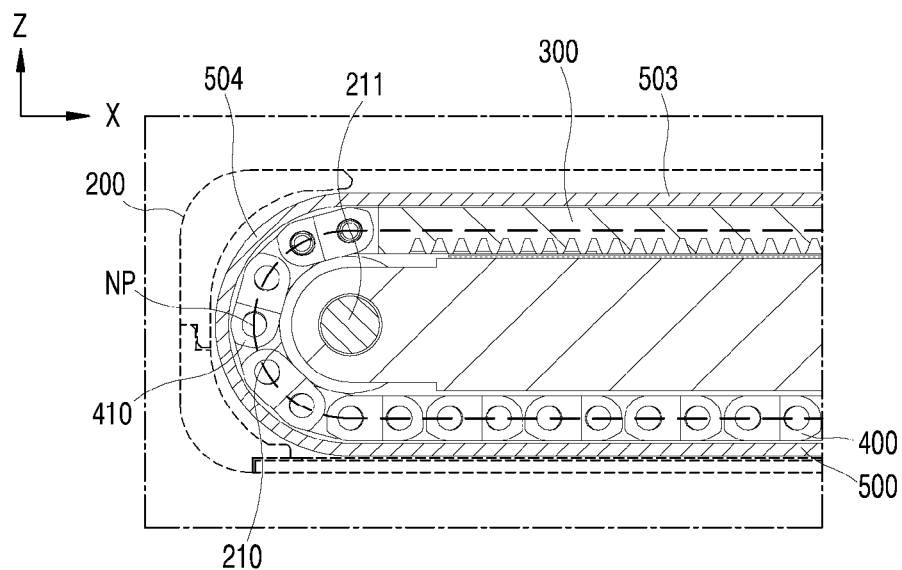
FIGS. 10b and 10c are cross-sectional views of a flexible display device according to an embodiment of the present disclosure for explaining a neutral plane.
Figure 10C:
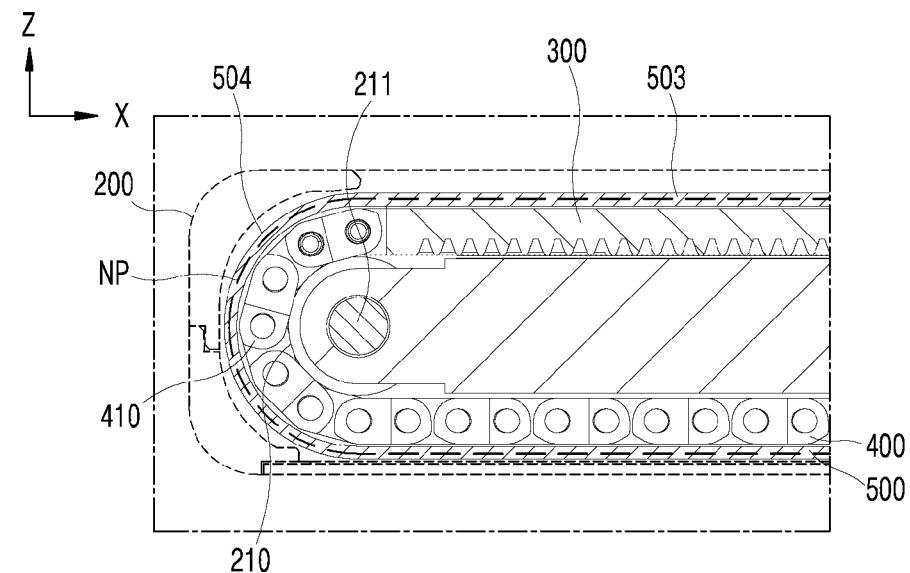

FIG. 10a is a cross-sectional view of the flexible display device 1 illustrated in FIG. 2a taken along the line C-C', and FIGS. 10b and 10c are cross-sectional views of a flexible display device 1 according to an embodiment of the present disclosure for explaining a neutral plane.

In the display device 1 according to an embodiment of the present disclosure, the flexible display 500 may include a first coupling area 503, a separated area 504, and a second coupling area 505.

The first coupling area 503 may be an area coupled to the outer surface of the moving plate 300. In the first coupling area 503, the flexible display 500 may be closely coupled to the outer surface of the moving plate 300. Here, the first coupling area 503 of the flexible display 500 and the moving plate 300 may be coupled to each other using an adhesive tape or the like.

The first coupling area 503 may coincide with the basic exposed region 501 described above, or may be an area that corresponds to the basic exposed region 501.

The separated area 504 may be a part of the flexible display 500 that extends from the first coupling area 503 and is not coupled to the outer surface of the driving track 400. That is, in the separated area 504, the flexible display 500 may be in close contact with the driving track 400 but may not be adhered or coupled to the driving track 400. The separated area 504 may be an area in which when an external force is applied, the flexible display 500 and the driving track 400 move relative to each other.

The separated area 504 may form a part of the additional exposed region 502 described above, or may occupy a substantial part of the additional exposed region 502.

When the driving track 400 includes the chain 410 and the guide plate 420, the separated area 504 may overlap the chain 410, excluding the first intermediate coupling portion 414.

The second coupling area 505 may be a part of the flexible display 500 that extends from the separated area 504 and is coupled to the outer surface of the driving track 400. The second coupling area 505 may form an end portion of the portion of the flexible display 500 that overlaps the driving track 400.

In the second coupling area 505, the flexible display 500 may be closely coupled to the outer surface of the driving track 400. Here, the second coupling area 505 of the flexible display 500 and the driving track 400 may be coupled to each other using an adhesive tape or the like.

When the driving track 400 includes the chain 410 and the guide plate 420, the second coupling area 505 may be an area that is coupled to the driving track 400 while overlapping the first intermediate coupling portion 414.

As described above, in the display device 1 according to the embodiment of the present disclosure, the first coupling area 503 of the flexible display 500 may be coupled to the outer surface of the moving plate 300, the separated area 504 may not be coupled to the outer surface of the driving track 400, and the second coupling area 505 may be coupled to the outer surface of the driving track 400.

If the separated area 504 of the flexible display 500 is coupled to the outer surface of the driving track 400, unlike in this embodiment of the present disclosure, when the flexible display 500 and the driving track 400 are bent around the first pulley 210, a neutral plane NP may be on the driving track 400 (i.e., on the chain 410). If so, a relatively strong (or impellent) tensile stress may be applied to the portion of the flexible display 500 that is bent around the first pulley 210 (see FIG. 10b).

Here, in order to remove the relatively strong tensile stress from the flexible display 500, the flexible display 500 may be required to be slid, or length compensation and the like may be required.

In the embodiment of the present disclosure, as described in detail above, the flexible display 500 may be configured so as not to be coupled to the outer surface of the driving track 400 in the separated area 504. Accordingly, when the flexible display 500 and the driving track 400 are bent around the first pulley 210, the neutral plane NP may be on the flexible display 500, and here, the tensile stress applied to the flexible display 500 bent around the first pulley 210 may be minimized (see FIG. 10c).

Figure 11A:
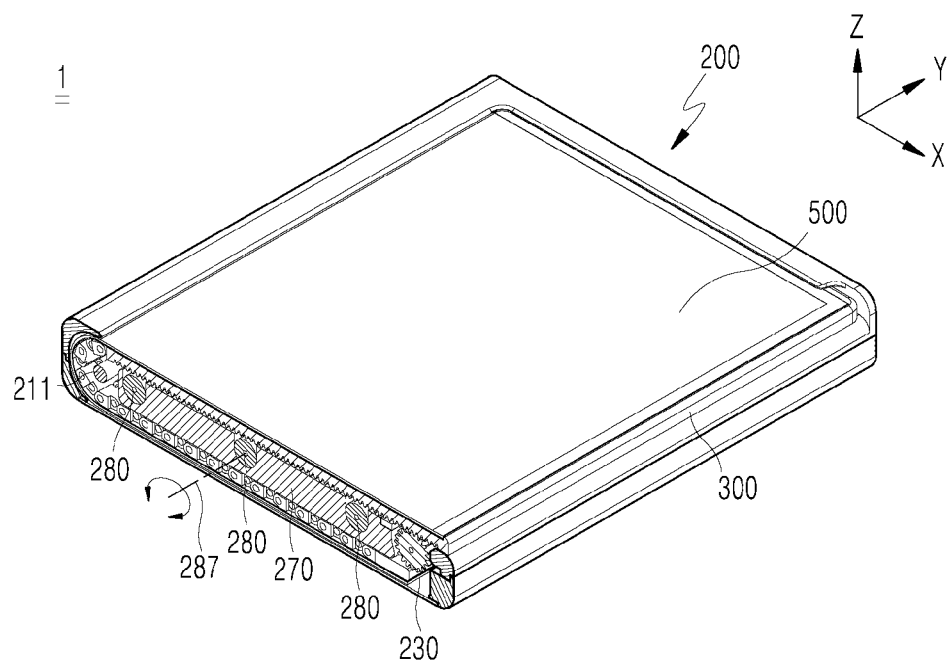
FIG. 11a is a perspective view of the flexible display device illustrated in FIG. 2a in a state in which some components have been cut out.
Figure 11B:
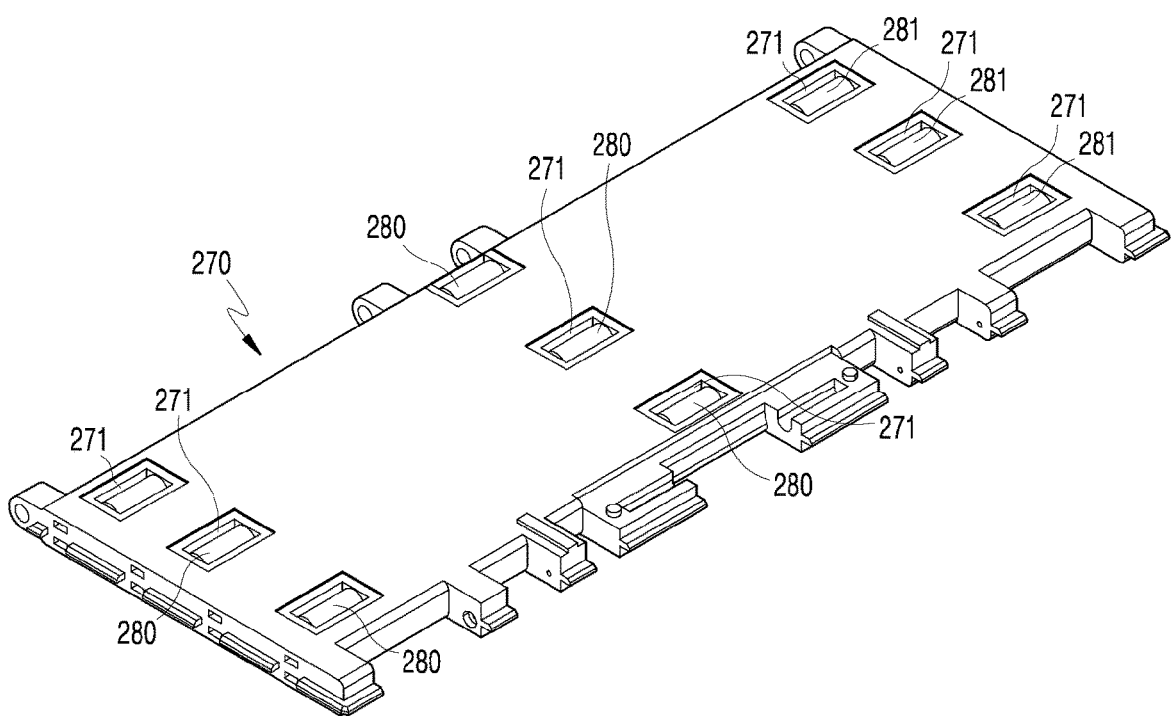

FIG. 11a is a perspective view of the flexible display device 1 illustrated in FIG. 2a in a state in which some components have been cut out, and FIG. 11b is a perspective view illustrating an inner plate 270 and rolling magnets 280 of FIG. 11a.

The display device 1 according to the embodiment of the present disclosure may include an inner plate 270 and rolling magnets 280.

The inner plate 270 may be provided under the moving plate 300 and inside the driving track 400, and an outer surface of the inner plate 270 may be parallel to an inner surface of the driving track 400.

The moving plate 300 may be reciprocally movable in the front-rear direction immediately on the outer surface (i.e., upper surface) of the inner plate 270.

Accommodating grooves 271 may be repeatedly formed in the inner plate 270. The accommodating grooves 271 may be repeatedly formed along the front-rear direction and along the left-right direction.

When the accommodating grooves 271 are repeatedly formed along the front-rear direction in the inner plate 270, distances therebetween may be constant, and when the accommodating grooves 271 are repeatedly formed along the left-right direction, distances therebetween may be constant.

The rolling magnets 280 may be accommodated in the accommodating grooves 271 in such a way that the rolling magnets 280 do not protrude farther than the outer surface of the inner plate 270, and may be coupled to the inner plate 270 so as to be rotatable about a third rotary shaft 287 parallel to the first rotary shaft 211.

Each of the rolling magnets 280 may be formed to have an entirely cylindrical shape, and here, the third rotary shaft 287 may be a central axis of the cylindrical shape.

The rolling magnets 280 may be made of a permanent magnet, or may be formed to include a permanent magnet.

The rolling magnets 280 may be formed such that a magnetic force acts between the rolling magnets 280 and the flexible display 500.

For the magnetic force to act between the rolling magnets 280 and the flexible display 500, the flexible display 500 may include a magnetic substance. Here, the magnetic substance may be uniformly dispersed over the entire area of the flexible display 500.

Alternatively, for the magnetic force to act between the rolling magnets 280 and the flexible display 500, the rolling magnets 280 may be formed such that magnetic force acts between the rolling magnets 280 and the back plate 520 which was described in detail above.

The rolling magnets 280 may be formed such that an attractive force acts between the rolling magnets 280 and the flexible display 500. Alternatively, the rolling magnets 280 may be formed such that a repulsive force acts between the rolling magnets 280 and the flexible display 500. Here, which of the attractive force or the repulsive force is to act to maintain the flatness of the flexible display 500 may be determined depending on a surrounding structure.

When the moving plate 300 moves forward or backward above the rolling magnets 280, a magnetic force may act between the rolling magnets 280 and the flexible display 500, and the rolling magnets 280 may rotate about the third rotary shaft 287. The rotation of the rolling magnets 280 may not interrupt sliding of the flexible display 500 (i.e., the front-rear directional movement of the flexible display 500), may restrict up-down movement of the flexible display 500, and may prevent the flexible display 500 from lifting or loosening such that the flexible display 500 is maintained in a flat state.

Figure 12A:
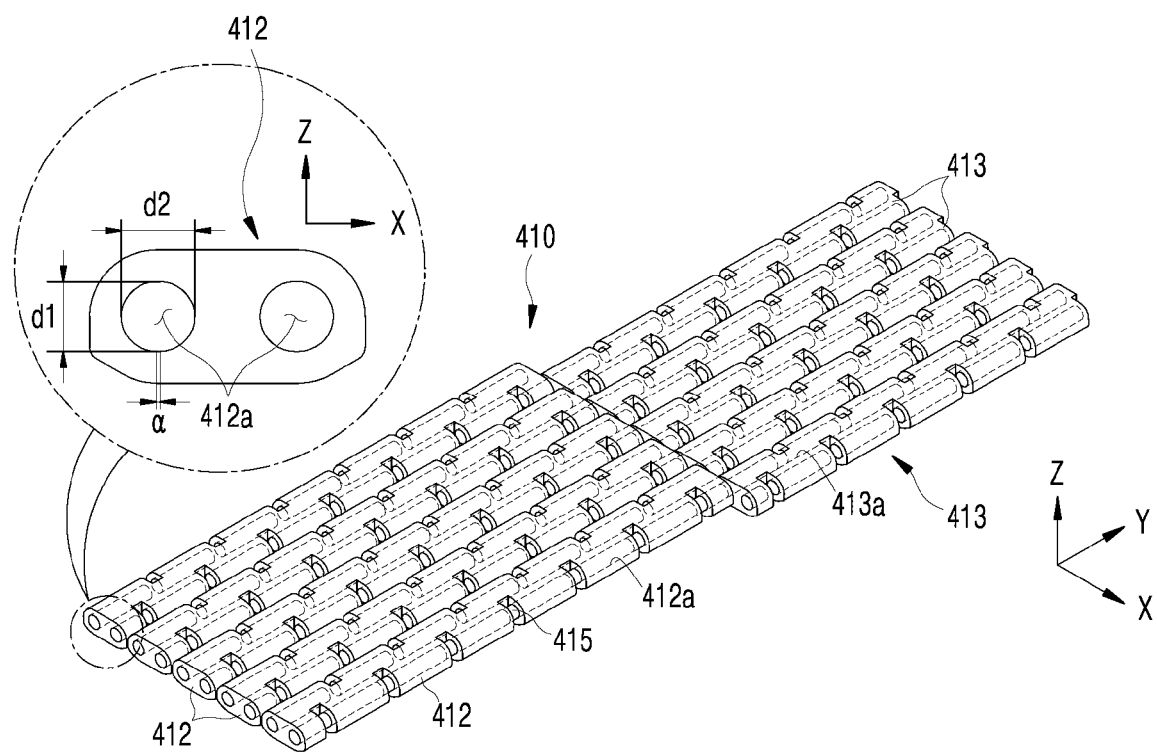
FIG. 12a is a perspective view illustrating a part of a chain of a flexible display device according to an embodiment of the present disclosure.
Figure 12B:
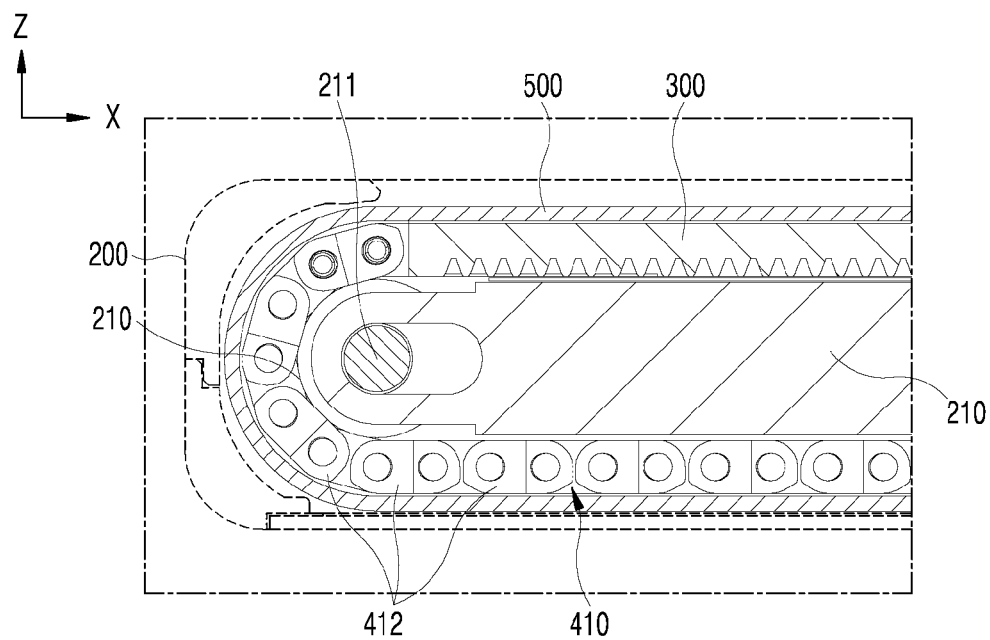
FIG. 12b is a cross-sectional view illustrating the chain bent around a first pulley.

FIG. 12a is a perspective view illustrating a part of the chain 410 of the flexible display device 1 according to an embodiment of the present disclosure, and FIG. 12b is a cross-sectional view illustrating the chain 410 bent around the first pulley 210.

The chain 410 which forms the driving track 400 may include a first link 412, a second link 413, and a link pin 415.

The first link 412 and the second link 413 may be provided as a plurality of first links 412 and a plurality of second links 413, respectively.

The plurality of first links 412 may be arranged along the front-rear direction, and the plurality of second links 413 may also be arranged along the front-rear direction. The first links 412 and the second links 413 may be fastened to each other.

For the fastening between the first links 412 and the second links 413, a first link hole 412a may be formed in the first links 412, and a second link hole 413a may be formed in the second links 413, wherein the link pin 415 may be inserted into the first link hole 412a and the second link hole 413a and coupled thereto.

The first link 412 and the second link 413 may rotate relative to each other about the link pin 415 coupled thereto.

Two identical first link holes 412a may be formed in a first link 412 to be spaced apart from each other, and two identical second link holes 413a may be formed in a second link 413 to be spaced apart from each other.

The link pin 415 may have a circular cross-section, and each of the second link holes 413a may also have a circular cross-section. Each of the first link holes 412a may be formed in the shape of an elongated hole having a relatively greater diameter along the length direction of the chain 410. That is, referring to FIG. 12a, the first link hole 412a may be formed such that a diameter d2 in the length direction is greater than a diameter d1 in the thickness direction (by the length of α).

For example, the first link hole 412a may be formed such that the diameter d2 in the length direction is greater than the diameter d1 in the thickness direction by 0.2 mm.

When the chain 410 (a combination of the links) is bent, or specifically, when the chain 410 is wound around the first pulley 210, unlike when the chain 410 is straight, some links may be required to move away from each other, or some links may be required to come close to each other, for smooth deformation of the chain 410. This is because the portion of the chain 410 that is wound around the first pulley 210 cannot form a part of a complete circle (for example, a complete semicircle).

In consideration of this, the display device 1 according to the embodiment of the present disclosure may be configured such that the first link hole 412a is formed as an elongated hole having a relatively greater diameter along the length direction of the chain 410, and accordingly, length compensation of the chain 410 may be achieved.

While specific exemplary embodiments of the present disclosure are described above and illustrated, it will be understood by those skilled in the art that the present disclosure is not limited to the described exemplary embodiments, and various changes and modifications may be made to the present disclosure without departing from the spirit and the scope of the present disclosure. Therefore, the scope of the present disclosure is not limited to the above-described exemplary embodiments, but shall be defined by the technical thought as recited in the following claims.

INDUSTRIAL APPLICABILITY

The flexible display device according to the embodiments of the present disclosure is characterized in that as the moving plate and the driving track support the flexible display, a uniform tension may be maintained over the entire section of the driving track, occurrence of springback in the flexible display may be minimized, and damage occurring to due to unevenness of the flexible display may be prevented. Accordingly, the flexible display device according to the embodiments of the present disclosure has a high industrial applicability.

What is claimed is:

1. A flexible display device comprising:
    a body;
    a moving plate coupled so as to be reciprocally moveable in a front-rear direction in the body;
    a first pulley disposed below the moving plate and coupled to the body so as to be rotatable about a first rotary shaft parallel to a left-right direction;
    a second pulley disposed below the moving plate at a position further forward than the first pulley, and coupled to the body so as to be rotatable about a second rotary shaft parallel to the first rotary shaft;
    a driving track formed such that at least a part thereof is bent, the driving track being disposed to enclose the first pulley and the second pulley and coupled to the moving plate; and
    a flexible display of which a part is coupled to an outer surface of the moving plate, and of which another part is coupled to an outer surface of the driving track,
    wherein the driving track comprises:
        a first coupling portion forming one end of the driving track and coupled to a rear end of the moving plate; and
        a second coupling portion forming the other end of the driving track and coupled to a bottom surface of the moving plate or to the first coupling portion.

2. A flexible display device comprising:
    a body;
    a first pulley coupled to the body so as to be rotatable about a first rotary shaft;
    a second pulley spaced apart from the first pulley, and coupled to the body so as to be rotatable about a second rotary shaft parallel to the first rotary shaft;
    a moving plate coupled to the body so as to be reciprocally movable along a movement path, wherein the movement path or a tangent line of the movement path is perpendicular to an arbitrary straight line parallel to the first rotary shaft;

a driving track formed such that at least a part thereof is bent, the driving track being disposed to enclose the first pulley and the second pulley and coupled to the moving plate; and a flexible display of which a part is coupled to an outer surface of the moving plate, and of which another part is coupled to an outer surface of the driving track, wherein the driving track comprises:

a first coupling portion forming one end of the driving track and coupled to a rear end of the moving plate; and a second coupling portion forming the other end of the driving track and coupled to a bottom surface of the moving plate or to the first coupling portion.

3. The flexible display device of claim 1, wherein the flexible display comprises:

a basic exposed region exposed at a part of the flexible display that overlaps the outer surface of the moving plate; and an additional exposed region exposed at a part of the flexible display that overlaps the outer surface of the driving track, wherein as the moving plate moves, a size of a portion of the additional exposed region that is exposed at the same side as the basic exposed region is varied.

4. The flexible display device of claim 1, wherein gear teeth are repeatedly formed on an inner surface of the moving plate along a movement direction, and the flexible display device further comprises:

a driving gear engaged with the gear teeth of the moving plate; and a driving motor configured to rotate the driving gear.

5. The flexible display device of claim 1, wherein the driving track comprises:

a chain forming the first coupling portion at one end thereof, and comprising a plurality of links rotatably connected to each other about each rotation axis thereof parallel to the first rotary shaft; and a guide plate of which at least a part is formed of a metal plate having elasticity, and of which one end is connected to the chain and the other end forms the second coupling portion.

6. The flexible display device of claim 5, wherein the guide plate comprises:

a pair of supports forming both side edges of the guide plate along a length direction; and a plurality of first through holes formed to pass through the guide plate between the pair of supports and each having a shape elongated in a width direction.

7. The flexible display device of claim 5, wherein chain is wound around the first pulley and is not wound around the second pulley, and the guide plate is wound around the second pulley and is not wound around the first pulley.

8. The flexible display device of claim 1, wherein the flexible display comprises:

a basic exposed region exposed at a part of the flexible display that overlaps the outer surface of the moving plate; and an additional exposed region exposed at a part of the flexible display that overlaps the outer surface of the driving track, wherein as the moving plate moves, a size of a portion of the additional exposed region that is exposed at the same side as the basic exposed region is varied, wherein the driving track comprises:

a chain forming the first coupling portion at one end thereof, and comprising a plurality of links rotatably connected to each other about each rotation axis thereof parallel to the first rotary shaft; and a guide plate of which at least a part is formed of a metal plate having elasticity, and of which one end is connected to the chain and the other end forms the second coupling portion, wherein the additional exposed region overlaps an outer surface of the chain, and wherein an outer surface of a link that overlaps the portion of the additional exposed region that is exposed at the same side as the basic exposed region forms a single plane surface or curved surface together with the outer surface of the moving plate.

9. The flexible display device of claim 1, wherein the flexible display comprises a back plate formed of a metal plate having elasticity, wherein the back plate comprises:

a fixed area overlapping the outer surface of the moving plate; and a transformable area overlapping the outer surface of the driving track and comprising a plurality of through holes formed therein, each of the plurality of through holes having a shape elongated in a width direction, wherein the transformable area comprises:

an edge portion divided into a plurality of edge portions spaced apart from each other to form an edge of the back plate;

a plurality of horizontal connecting portions extending from the edge portion in the width direction; and a plurality of first vertical connecting portions configured to connect two horizontal connecting portions that extend from two different edge portions.

10. The flexible display device of claim 1, wherein the first pulley and the second pulley are configured to relatively move in directions away from each other, and the flexible display device further comprises an elastic body configured to elastically support any one of the first pulley or the second pulley in a direction away from the other one of the first pulley or the second pulley.

11. The flexible display device of claim 1, wherein the flexible display comprises:

a first coupling area coupled to the outer surface of the moving plate;

a separated area formed to extend from the first coupling area and not to be coupled to the outer surface of the driving track; and a second coupling area extending from the separated area and coupled to the outer surface of the driving track.

12. The flexible display device of claim 11, further comprising:

an inner plate provided under the moving plate and inside the driving track such that an outer surface of the inner plate is parallel to an inner surface of the driving track, and comprising accommodating grooves formed therein; and rolling magnets accommodated in the accommodating grooves in such a way that the rolling magnets do not protrude farther than the outer surface of the inner plate, coupled to the inner plate so as to be rotatable about a third rotary shaft parallel to the first rotary shaft, configured such that a magnetic force acts between the rolling magnets and the flexible display, and formed to have a circular cross section.

13. The flexible display device of claim 5, wherein the chain comprises:
- a first link in which a first link hole is formed;
- a second link in which a second link hole is formed; and
- a link pin inserted into the first link hole and the second link hole to connect the first link and the second link,
- wherein the first link hole is formed as an elongated hole having a relatively greater diameter in a length direction of the chain.

14. The flexible display device of claim 2, wherein the flexible display comprises:
- a basic exposed region exposed at a part of the flexible display that overlaps the outer surface of the moving plate; and
- an additional exposed region exposed at a part of the flexible display that overlaps the outer surface of the driving track,
- wherein as the moving plate moves, a size of a portion of the additional exposed region that is exposed at the same side as the basic exposed region is varied.

15. The flexible display device of claim 2, wherein gear teeth are repeatedly formed on an inner surface of the moving plate along a movement direction, and
the flexible display device further comprises:
- a driving gear engaged with the gear teeth of the moving plate; and
- a driving motor configured to rotate the driving gear.

16. The flexible display device of claim 2, wherein the flexible display comprises a back plate formed of a metal plate having elasticity,
wherein the back plate comprises:
- a fixed area overlapping the outer surface of the moving plate; and
- a transformable area overlapping the outer surface of the driving track and comprising a plurality of through holes formed therein, each of the plurality of through holes having a shape elongated in a width direction,
wherein the transformable area comprises:
- an edge portion divided into a plurality of edge portions spaced apart from each other to form an edge of the back plate;
- a plurality of horizontal connecting portions extending from the edge portion in the width direction; and
- a plurality of first vertical connecting portions configured to connect two horizontal connecting portions that extend from two different edge portions.

17. The flexible display device of claim 2, wherein the first pulley and the second pulley are configured to relatively move in directions away from each other, and the flexible display device further comprises an elastic body configured to elastically support any one of the first pulley or the second pulley in a direction away from the other one of the first pulley or the second pulley.

18. The flexible display device of claim 2, wherein the flexible display comprises:
- a first coupling area coupled to the outer surface of the moving plate;
- a separated area formed to extend from the first coupling area and not to be coupled to the outer surface of the driving track; and
- a second coupling area extending from the separated area and coupled to the outer surface of the driving track.

* * * * *